(12) United States Patent
Kumar et al.

(10) Patent No.: US 11,232,607 B2
(45) Date of Patent: Jan. 25, 2022

(54) ADDING COLOR TO DIGITAL IMAGES

(71) Applicant: Adobe Inc., San Jose, CA (US)

(72) Inventors: Nishant Kumar, Siliguri (IN); Vikas Sharma, Gurgaon (IN); Shantanu Agarwal, Lucknow (IN); Sameer Bhatt, Noida (IN); Rupali Arora, Sunam (IN); Richard Zhang, Naperville, IL (US); Anuradha Yadav, New Delhi (IN); Jingwan Lu, Santa Clara, CA (US); Matthew David Fisher, San Carlos, CA (US)

(73) Assignee: Adobe Inc., San Jose, CA (US)

( * ) Notice: Subject to any disclaimer, the term of this patent is extended or adjusted under 35 U.S.C. 154(b) by 243 days.

(21) Appl. No.: 16/751,959

(22) Filed: Jan. 24, 2020

(65) Prior Publication Data
US 2021/0233287 A1 Jul. 29, 2021

(51) Int. Cl.
G06T 11/00 (2006.01)
G06T 7/90 (2017.01)
G06K 9/46 (2006.01)
H04N 1/60 (2006.01)

(52) U.S. Cl.
CPC .......... *G06T 11/001* (2013.01); *G06K 9/4652* (2013.01); *G06T 7/90* (2017.01); *H04N 1/6008* (2013.01)

(58) Field of Classification Search
CPC .......... G06T 11/001; G06T 7/90; G06K 5/00; H04N 1/60–628
See application file for complete search history.

(56) References Cited

U.S. PATENT DOCUMENTS

| 8,553,045 B2 * | 10/2013 | Skaff | G09G 5/06 345/593 |
| 2004/0001072 A1 * | 1/2004 | Newman | H04N 1/6052 345/593 |
| 2004/0057614 A1 * | 3/2004 | Ogatsu | H04N 1/6058 382/162 |

(Continued)

OTHER PUBLICATIONS

"How to Adjust Specific Colors with Hue & Saturation Adjustment Layers in Photoshop", Retrieved at: https://www.youtube.com/watch?v=YEY4RID2dlc, Mar. 5, 2014, 1 page.

*Primary Examiner* — Sean T Motsinger
(74) *Attorney, Agent, or Firm* — FIG. 1 Patents

(57) ABSTRACT

In implementations of adding color to digital images, an image colorization system can display a digital image to be color adjusted in an image editing interface and convert pixel content of the digital image to a LAB color space. The image colorization system can determine a lightness value (L) in the LAB color space of the pixel content of the digital image at a specified point on the digital image, and determine colors representable in an RGB color space based on combinations of A,B value pairs with the lightness value (L) in the LAB color space. The image colorization system can then determine a range of the colors for display in a color gamut in the image editing interface, the range of the colors corresponding to the A,B value pairs with the lightness value (L) of the pixel content at the specified point on the digital image.

20 Claims, 10 Drawing Sheets
(6 of 10 Drawing Sheet(s) Filed in Color)

(56) References Cited

U.S. PATENT DOCUMENTS

| | | | |
|---|---|---|---|
| 2009/0244569 A1* | 10/2009 | Watanabe | H04N 1/62 358/1.9 |
| 2009/0259567 A1* | 10/2009 | Watts | G06T 11/60 705/26.1 |
| 2010/0026206 A1* | 2/2010 | Sekulovski | H05B 47/165 315/294 |
| 2011/0074807 A1* | 3/2011 | Inada | G06T 11/001 345/589 |
| 2012/0092359 A1* | 4/2012 | O'Brien-Strain | G06T 7/11 345/589 |
| 2014/0237429 A1* | 8/2014 | Abrahami | G06F 3/04842 715/835 |
| 2014/0292799 A1* | 10/2014 | Shekey | G09G 5/06 345/594 |
| 2015/0314141 A1* | 11/2015 | Choi | A45D 44/00 347/110 |
| 2016/0381254 A1* | 12/2016 | Poree | H04N 1/6066 382/167 |
| 2019/0279402 A1* | 9/2019 | Panetta | G06T 7/10 |
| 2019/0279598 A1* | 9/2019 | Mito | H04N 9/67 |
| 2019/0354265 A1* | 11/2019 | Winnemoeller | G06F 3/04845 |
| 2019/0355155 A1* | 11/2019 | Shugrina | G06T 11/001 |
| 2019/0385344 A1* | 12/2019 | Martin | G06T 11/001 |
| 2020/0151448 A1* | 5/2020 | Lin | G06N 3/04 |
| 2020/0302656 A1* | 9/2020 | Kumar | G06F 3/04845 |
| 2020/0349745 A1* | 11/2020 | Shugrina | G06T 11/001 |
| 2020/0357100 A1* | 11/2020 | Tichelaar | G06T 9/00 |
| 2021/0042965 A1* | 2/2021 | Phogat | G06T 11/001 |
| 2021/0142532 A1* | 5/2021 | Echevarria Vallespi | G09G 5/06 |
| 2021/0233287 A1* | 7/2021 | Kumar | G06K 9/4652 |

\* cited by examiner

900

Determine colors representable in an RGB color space based on combinations of A,B value pairs with a lightness value (L) in a LAB color space, the lightness value (L) corresponding to pixel content at a specified point of a digital image to be color adjusted
902

Cluster the colors into color clusters
904

Determine a color palette for display in an image editing interface of the computing device, the color palette including a respective color that is closest to a respective color center for each respective color cluster
906

FIG. 9

ADDING COLOR TO DIGITAL IMAGES

BACKGROUND

Adjusting colors of images via image editing applications is among the most common image editing tasks. For example, a user may upload a digital image into an image editing application and select a color adjustment tool. In response to the user selection of the color adjustment tool, the image editing application may display a color selection interface (also commonly referred to as a "color picker") with different colors (e.g., hues and saturations). However, the colors displayed by the image editing application are usually default or generic values, such as hues and saturations representing a complete range of colors available to the user by the image editing application. As such, the image editing application may display colors that represent a poor starting point for the user to edit a particular image. Accordingly, the user may select a color from the color selection interface displayed by the image editing application, edit the image based on the selected color, and repeat these steps multiple times until the user is satisfied with the color adjustments to the image.

Moreover, the coloring results obtained by the user may be sub-standard or unacceptable. For instance, the user may grow tired of repeating the process of selecting a color, adjusting the image, and selecting another color to adjust the image because the previously-selected color from the color selection interface was not a desirable choice by the user. Hence, the user may settle on a sub-standard coloring of the image, rather than continue to repeat the coloring steps. Furthermore, because the colors displayed by the color selection interface may be far from the user's color expectations for a digital image, the coloring results obtained for the image may simply not meet the user's standards, resulting in a poor user experience.

Consequently, conventional image editing applications are inefficient because they can be tedious to use and waste a user's time when adding color to images. Moreover, the conventional image editing applications can produce sub-standard and unacceptable color adjustments.

SUMMARY

Techniques and systems are described for adding color to digital images. An image colorization system is implemented to display suggested colors for adding color to a digital image that are based on the digital image itself, rather than simply a default or generic set of colors that is not based on the digital image. The image colorization system can convert pixel content of the digital image to be color adjusted to a LAB color space and determine the suggested colors from the LAB color space. For instance, the image colorization system can receive one or more user inputs that indicate a point on the digital image, and determine a lightness value in the LAB color space of the point from the conversion of the digital image to the LAB color space. The image colorization system can determine LAB values in the LAB color space having the lightness value from valid A,B pairs, e.g., A,B pairs in the LAB color space that can be combined with the lightness value to form a color representable in an RGB color space. The image colorization system can then display a range of colors in a color gamut in a user interface that represent the LAB values having the lightness value of the point on the digital image to be color adjusted. The image colorization system can sort the colors that are displayed in the color gamut with a two-dimensional Hilbert curve to smooth the transitions between the displayed colors.

The image colorization system can also determine additional colors having different saturations of an indicated color in the color gamut, such as a user-selected color in the color gamut, from a region in an AB plane. The image colorization system can determine the region from an angle in the AB plane of the A value and the B value of the indicated color of the color gamut, and valid A values and B values for the lightness value of the point on the digital image. The image colorization system can display the additional colors having the different saturations of the indicated color in a color saturation chart in the user interface. The image colorization system can also cluster colors of the color gamut, determine a respective color for each of the clusters, and display the respective color for each of the clusters in a color palette in the user interface. A user can select a color from the color gamut, the color saturation chart, or the color palette, and adjust a color of the digital image based on the selected color.

Hence, the image colorization system provides suggested colors that are determined from the digital image itself, and therefore represent a good starting point to add color to the digital image, unlike conventional colorization systems that do not suggest colors based on the digital image, but instead display generic or default colors unrelated to the digital image. Hence, the image colorization system is efficient, and can produce colorization results superior to conventional colorization systems. Moreover, because the image colorization system determines colors to suggest based on a lightness value of a point on the digital image, the image colorization system can be implemented and used to suggest colors for both black-and-white images and color images, the suggested colors based on the images themselves.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 9 illustrates a flow diagram depicting an example procedure in accordance with one or more aspects of the disclosure.

DETAILED DESCRIPTION

Overview

Figure 1:
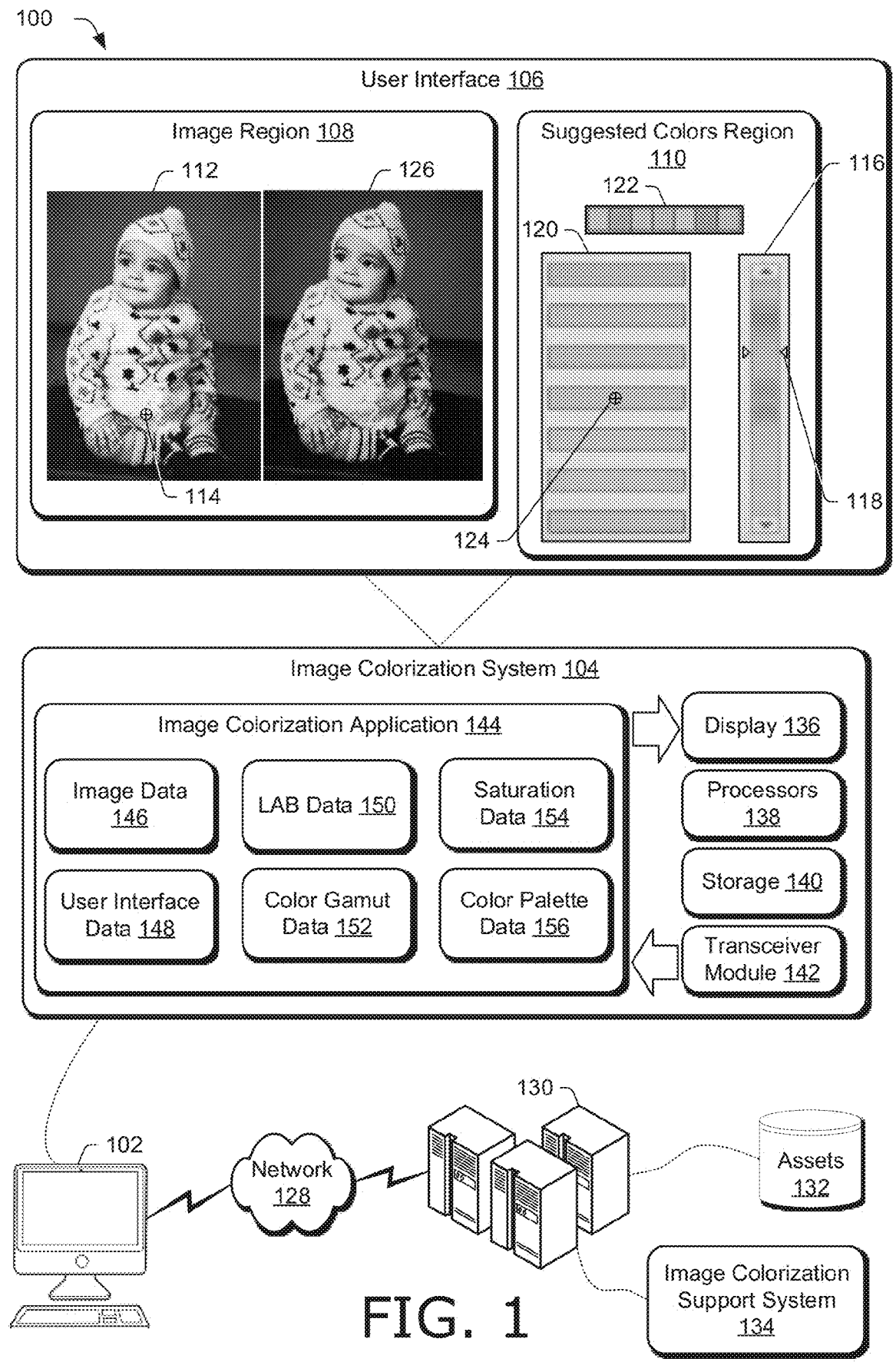
FIG. 1 illustrates a digital medium environment in an example implementation that is operable to employ techniques described herein.

Conventional image editing applications allow users to adjust colors of a digital image usually by displaying some form of a color selection interface (also referred to as a color picker), from which a user can select a hue or saturation to edit the digital image. Hue refers to an actual (or pure) color and may be determined by a wavelength in the visible spectrum with greatest energy. Saturation refers to an amount of grey mixed with the color, and is an expression for the relative bandwidth of the color. For instance, as saturation increases, colors appear more "pure", and as saturation decreases, colors appear more "washed-out".

However, the hues and saturations displayed by conventional image editing applications for adding color to a digital image are usually default or generic values, and are not based on the digital image itself. For instance, a conventional image editing application may simply display hues and saturations representing a complete range of colors available to the user by the image editing application without taking into account the digital image that is being edited. That is, the conventional image editing application may display a color selection interface that depicts the same colors for all digital images being edited. Consequently, the conventional image editing application may display hues and saturations that represent a poor starting point for the user to edit the digital image, causing the user to expend significant effort when adjusting the color of the image, such as by repeating the process of selecting a color, adjusting the image, and selecting another color to adjust the image because the previously-selected color from the color selection interface did not produce an expected or desired color result. Because of the required effort, the user may settle on a sub-standard coloring of the digital image. Moreover, because the colors displayed by the color selection interface may be far from the user's color expectations for the digital image, the coloring results obtained for the digital image by the user may simply not meet the user's standards.

Accordingly, this disclosure describes systems, devices, and techniques for adding color to digital images by suggesting and displaying colors in a user interface that are based on the digital image being edited (e.g., color adjusted) in the user interface, rather than simply a default or generic set of colors that is not based on the digital image. An image colorization system can receive one or more user inputs that indicate a point on a digital image to be color adjusted. In one example, the image colorization system displays an indicator of the point (e.g., a droplet that points to or overlaps the point) on the digital image. The image colorization system can populate the indicator with a suggested color, such as by filling the droplet to display a suggested color. Hence, the user can see the suggested color in the context of the digital image, e.g., at or near the user-selected point on the digital image to be color adjusted via the colored indicator.

To determine suggested colors to display for adding color to the digital image, the image colorization system can convert pixel content of the digital image to a LAB color space, in which a first dimension represents lightness (or luminance), a second dimension represents green-red, and a third dimension represents blue-yellow. Hence, a color in the color space can be denoted as a three-tuple LAB value, including a value of L for the lightness, and A and B values for the green-red and blue-yellow color components, respectively. The image colorization system can determine a lightness value in the LAB color space of the specified point on the digital image to be color adjusted. The lightness value corresponds to the L value in the LAB color space and is denoted in the following by "lightness value (L)". Based on the lightness value (L), the image colorization system can determine colors representable in an RGB color space from combinations of A,B value pairs with the lightness value (L), e.g., LAB values in the LAB color space having the lightness value (L). In one example, the image colorization system determines a dense color set for the LAB color space that includes valid A values and B values for the lightness value (L), and the LAB values in the LAB color space having the lightness value (L) from the dense color set. The image colorization system can determine the dense color set iteratively, by transforming LAB values to RGB values and the RGB values back to LAB values, replacing the L values of the LAB values with the lightness value (L) corresponding to the pixel content of the specified point, and repeating the transformations until the transformed LAB values converge and include valid pairs of A values and B values. Hence, the image colorization system can determine LAB values in the LAB color space having the lightness value (L) of the specified point on the digital image to be color adjusted from A,B pairs in the LAB color space that can be combined with the lightness value (L) to form a color representable in an RGB color space.

To determine the LAB values of colors in the LAB color space having the lightness value (L) from the dense color set, the image colorization system can cluster the LAB values from the dense color set, and determine a representative LAB value for each cluster as one of the colors in the LAB color space having the lightness value (L). In one example, the image colorization system determines 529 clusters, and therefore 529 colors (e.g., LAB values) in the LAB color space having the lightness value (L) of the user-specified point on the digital image to be color adjusted.

The image colorization system can determine a range of the colors for display in a color gamut, the range of the colors corresponding to the A,B value pairs with the lightness value (L) of the pixel content at the specified point on the digital image. For example, the range of colors can represent the LAB values in the LAB color space having the lightness value (L), and the image colorization system can display the range of colors in a color gamut in a user interface. In one example, the image colorization system sorts the colors in the LAB color space having the lightness value (L) by applying a two-dimensional Hilbert curve to the A,B value pairs of the colors to form sorted colors. The Hilbert curve smooths the transitions between the sorted colors. The image colorization system can display the sorted colors as the range of colors in the color gamut in the user interface. The color gamut can include a mechanism to select a color, such as a slider. The slider can indicate a color of the color gamut, such as a user-selected color or a default color (e.g., a first color in the color gamut prior to a user selection of a color in the color gamut).

The image colorization system can also determine additional colors having different saturations of an indicated color of the color gamut. The indicated color can be a default color of the color gamut or a user-selected color in the color gamut that is selected via the slider mechanism. To determine the additional colors having different saturations of the indicated color, the image colorization system can determine a region in an AB plane (e.g., a plane of A values and B values) from an angle in the AB plane of the A value and the B value of the indicated color, and the valid A values and B values for the lightness value (L) of the user-selected point on the digital image. The image colorization system can determine an interior formed from an upper line in the AB plane and a parallel lower line in the AB plane that are at the angle of the A value and the B value of the indicated color, and separated by a threshold distance. The image colorization system can determine the region from the intersection of the interior to the upper line and lower line, and the valid A values and B values for the lightness value (L) of the point on the digital image. Within this region that encloses the A value and the B value of the indicated color, the image colorization system can select a plurality of pairs of A values and B values and combine them with the lightness value (L) to form the additional colors having different saturations of the indicated color of the color gamut. The image colorization system can display the additional colors having the different saturations of the indicated color in a color saturation chart in the user interface.

In one example, the image colorization system determines an order of the additional colors based on distances of points corresponding to the A,B value pairs of the additional colors to an origin of the AB plane, and displays the additional colors at positions of the color saturation chart determined from the order. For instance, the image colorization system can display rectangles each filled with one of the additional colors vertically in the color saturation chart (e.g., one rectangle on top of another rectangle), with a position in the vertical display determined from the order. For example, a rectangle filled with an additional color having an A value and a B value closest to the origin of the AB plane can be displayed at the bottom of the vertical display of rectangles in the color saturation chart, and another rectangle filled with an additional color having an A value and a B value furthest from the origin of the AB plane can be displayed at the top of the vertical display of rectangles in the color saturation chart.

The image colorization system can also cluster colors of the color gamut (e.g., the sorted colors formed from the Hilbert curve) and determine a respective color for each of the clusters. The image colorization system can then display the respective color for each of the clusters in a color palette. The color palette indicates, at a quick glance and at a high level, a reduced version of the suggested colors for the digital image being edited. Hence, the color palette may be useful to novice users by providing a simplified mechanism for color selection from a limited selection of colors suggested for the digital image.

The image colorization system facilitates a user selection of a color from one or more of the range of colors of the color gamut, the additional colors having the different saturations in the color saturation chart, or the reduced set of colors in the color palette. Based on the user-selected color, the image colorization system can adjust one or more colors of a portion of the digital image. For instance, the image colorization system can receive, via the user interface, a user selection of a portion of the digital image that includes the point. For example, a user may select the portion of the digital image with a mask tool that segments an object corresponding to the portion of the image, and then the user may click on a location of the object to indicate the point for which the user would like the image colorization system to suggest colors. Based on the user-selected point and its lightness value (L) in the LAB color space, the image colorization system may display in the user interface a color gamut including a range of colors representing the LAB values having the lightness value (L), a color saturation chart including additional colors having different saturations of one of the colors in the color gamut, and a color palette including a reduced set of the range of the colors representing the LAB values having the lightness value (L). The user may then select a color from the suggested colors in the user interface (e.g., from the color gamut, the color saturation chart, or the color palette), and the image colorization system can adjust a color of at least the portion of the digital image that includes the point based on the selected color.

Hence, the image colorization system provides suggested colors that are determined from the digital image itself, and therefore represent a good starting point to add color to the digital image, unlike conventional colorization systems that do not suggest colors based on the digital image, but instead display generic or default colors unrelated to the digital image. Hence, the image colorization system is efficient, and can produce colorization results superior to conventional colorization systems. Moreover, because the image colorization system determines colors to suggest based on a lightness value (L) of a specified point on the digital image, the image colorization system is not limited to suggesting colors for color images, but can also suggest colors for black-and-white images.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 depicted as a desktop computer, which is an example computing device. Computing device 102 can generally include any suitable type of computing device, such as a mobile phone, tablet, laptop computer, desktop computer, goggles, glasses, camera, digital assistant, image editor, non-linear editor, digital audio workstation, copier, scanner, client computing device, and the like. Hence, computing device 102 may range from full resource devices with substantial memory and processor resources (e.g., personal computers, game consoles, etc.) to low-resource devices with limited memory or processing resources (e.g., mobile devices).

Notably, computing device 102 can include any suitable number of computing devices, such as one or more computing devices, (e.g., a smart phone connected to a tablet). Furthermore, discussion of one computing device of computing device 102 is not limited to that one computing device, but generally applies to each of the computing devices included in computing device 102. Furthermore, computing device 102 may be representative of one or a plurality of different devices connected to a network that perform operations "over the cloud" as further described in relation to FIG. 10. In one example, computing device 102 includes multiple computing devices communicatively coupled to each other, such as with a low power wireless communication standard (e.g., a Bluetooth® protocol). Hence, an asset (e.g., digital image, video, text, drawing, artwork, document, file, and the like) generated, processed, edited, or stored on one device of computing device 102 (e.g., a desktop computer) can be communicated to, and displayed on and processed by another device of computing device 102 (e.g., a tablet).

Various types of input devices and input instrumentalities can be used to provide input to computing device 102. For example, computing device 102 can recognize input as being a mouse input, drawing-tool input, stylus input, touch input, input provided through a natural user interface, and the like. Thus, computing device 102 can recognize multiple types of gestures including touch gestures and gestures provided through a natural user interface. In one example, computing device 102 includes speech recognition, identification, and synthesis functionalities, microphones, and speakers that allow computing device 102 to communicate with a user in a conversation, such as in a user conversation.

Computing device 102 includes image colorization system 104 for adding color to digital images. The image colorization system 104 can generate a user interface 106 that is displayable on a display device of computing device 102. The user interface 106 is an example of an image editing interface, and includes an image region 108 and a suggested colors region 110. The image region 108 can display images, such as input images (e.g., digital images to be edited) and output images, such as any type of digital images that have been edited by having color added to them or their color adjusted by the image colorization system 104. The suggested colors region 110 can display colors determined by the image colorization system 104 taking into account a digital image displayed in the image region 108.

The image region 108 includes input image 112, such as a user-supplied image to the image colorization system 104. For instance, input image 112 can be a black and white image or a color image (e.g., a black and white image that has been recolored) uploaded to the image colorization system 104 by a user. In the example in FIG. 1, input image 112 depicts a black and white image of a baby wearing a sweater and a hat. The point 114 is a user-specified point on the sweater of the baby. For instance, a user can click on the point 114 with a mouse to designate the point 114. In one example, the user can select the sweater and the hat of the baby with a selection tool, such as a mask tool that segments the sweater and the hat of the baby, and then designate the point 114. Additionally or alternatively, the image colorization system 104 can segment the sweater and the hat of the baby automatically based on the user input that specifies the point 114. For instance, the user may click on the point 114 with a mouse, and in response to the mouse click, the image colorization system 104 can segment the sweater and the hat of the baby with an automatic segmentation tool, such as a neural network trained to segment objects in digital images.

In one example, the image colorization system 104 displays the suggested colors region 110 in the user interface 106 responsive to receiving the user input that specifies the point 114. For example, the user interface 106 can display the image region 108 and not display the suggested colors region 110 until the image colorization system 104 receives a user input designating the point 114. Additionally or alternatively, the image colorization system 104 can populate the suggested colors region 110 with suggested colors based on receiving a user input that specifies the point 114. For example, the image colorization system 104 can display the suggested colors region 110 without any suggested colors until the image colorization system 104 receives a user input designating the point 114. Based on receiving the user input designating the point 114, the image colorization system 104 can populate the suggested colors region 110 displayed in the user interface 106 with suggested colors for the input image 112 based on the point 114.

In an example, the suggested colors region 110 first displays suggested colors that include generic or default colors that are not determined from, or specifically for, the input image 112. The suggested colors region 110 can then, responsive to the image colorization system 104 receiving the user input designating the point 114, change the generic or default colors to suggested colors for the input image 112 based on the point 114 determined by the methods and systems described herein.

The image colorization system 104 can determine the suggested colors in the suggested colors region 110 based on the lightness value (L) of the point 114 on the image 112. For example, the image colorization system 104 can convert pixel content of the image 112 into a LAB color space and determine the lightness value (L) in the LAB color space of the point 114. As discussed below in more detail, a LAB color space depicts colors with a lightness value (L) in a lightness dimension, an A value in a green-red dimension, and a B value in a blue-yellow dimension. The image colorization system 104 can determine the colors in the LAB color space having the lightness value (L) of the point 114 from a dense color set for the LAB color space that includes valid pairs of A values and B values for the lightness value (L). For example, since only a subset of colors have a given lightness value (L), not all pairs of A values and B values are valid for that lightness value (L).

The image colorization system 104 can determine the dense color set of valid A,B value pairs for the lightness value (L) iteratively, by transforming LAB values to RGB values and the RGB values back to LAB values, and repeating the transformations using the lightness value (L) until the transformed LAB values converge and include the valid pairs of A values and B values for the lightness value (L). For example, the valid pairs of A values and B values correspond to A,B pairs in the LAB color space that can be combined with the lightness value (L) to form a color representable in an RGB color space. The image colorization system 104 can then cluster the LAB values from the dense color set, and determine a representative LAB value for each cluster as one of the colors in the LAB color space having the lightness value (L). In one example, the image colorization system 104 determines 529 clusters and 529 colors represented by LAB values in the LAB color space having the lightness value (L). Hence, the image colorization system 104 can determine the colors representable in an RGB color space as colors in the LAB color space formed from combinations of valid A,B value pairs with the lightness value (L) for the specified point on the digital image.

The image colorization system 104 can sort the colors in the LAB color space having the lightness value (L) of the point 114 with a two-dimensional Hilbert curve to smooth the transitions between the colors. A Hilbert curve is a fractal, space-filling curve. Since the colors have the same lightness value (L), only a two-dimensional Hilbert curve, rather than a three-dimensional Hilbert curve, is needed. For instance, the image colorization system 104 can sort the A values and B values of the colors in the LAB color space having the lightness value (L) with a two-dimensional Hilbert curve to form sorted colors. The image colorization system 104 can display the sorted colors as a range of colors in color gamut 116 in the suggested colors region 110.

The color gamut 116 can display the range of colors that have the lightness value (L) of the point 114 in any suitable way. In the example in FIG. 1, the color gamut 116 displays the range of colors as a vertical array. The color gamut 116 also includes indicator 118 that indicates a current color of the range of colors of the color gamut. The indicator 118 can be any suitable indicator, such as one or more arrows, triangles, circles, etc. that indicates a color of the range of colors of the color gamut 116. For example, the indicated color in FIG. 1 is the color of the color gamut 116 at the position of the indicator 118 on the color gamut 116 (e.g., the color between the two triangles making up the indicator 118).

In one example, the indicator 118 corresponds to a default color of the range of colors of the color gamut 116. For instance, the suggested colors region 110 may be populated to include the color gamut 116 responsive to the image colorization system 104 receiving a user input designating the point 114. The user may not have yet selected a color of the color gamut 116 via the user interface 106, and hence the indicated color of the color gamut 116 can correspond to a default color of the range of colors of the color gamut 116, such as a first color in the range of colors displayed by the color gamut 116.

Additionally or alternatively, the indicator 118 of the color gamut 116 can indicate a user-selected color. For instance, a user may slide the indicator 118 along the color gamut 116 to select a color of the color range of the color gamut 116. The image colorization system 104 can then change the indicated color from a default color of the range of the colors of the color gamut to the user-selected color. The user can update the indicated color of the color gamut 116 by sliding the indicator up and down the color gamut 116 as desired.

The suggested colors region 110 also includes a color saturation chart 120. The image colorization system 104 can determine additional colors having the lightness value (L) of the point 114 and different saturations of the indicated color of the color gamut 116, and display the additional colors having the different saturations in the color saturation chart 120. The image colorization system 104 can determine any suitable number of additional colors to display in the color saturation chart 120. In one example, the image colorization system 104 determines seven additional colors having the lightness value (L) of the point 114 and different saturations of the indicated color of the color gamut 116, and displays the seven additional colors in color containers (e.g., rectangle, circle, square, triangle, and the like) in the color saturation chart 120, one additional color per color container. Additionally or alternatively, the number of additional colors and the style of the color container for the additional colors can be user specified, such as via user interface 106 (not shown in FIG. 1).

To determine the additional colors having the lightness value (L) of the point 114 and different saturations of the indicated color of the color gamut 116, the image colorization system 104 can determine a region in an AB plane (e.g., a plane of A values and B values) that includes the A value and the B value of the indicated color of the color gamut 116 and corresponds to valid pairs of A values and B values for the lightness value (L). The image colorization system 104 can select A values and B values from the region in the AB plane, and form the additional colors having the lightness value (L) of the point 114 and the different saturations of the indicated color of the color gamut 116 from the selected A values and B values from the region. In one example, image colorization system 104 determines an order of the additional colors based on distances of points corresponding to the A values and the B values of the additional colors to an origin of the AB plane, and displays the additional colors at positions of the color saturation chart 120 determined from the order. For example, rectangles at the bottom of the color saturation chart 120 can correspond to A values and B values that are closer to the origin of the AB plane than rectangles at the top of the color saturation chart 120.

The suggested colors region 110 also includes a color palette 122. The color palette 122 indicates, at a quick glance and at a high level, a reduced version of the suggested colors for the digital image 112, (e.g., a reduced version of the range of colors displayed by the color gamut 116). Hence, the color palette 122 may be useful to novice users by providing a simplified mechanism for color selection from a limited selection of colors suggested for the digital image 112.

To determine the colors displayed by the color palette 122, the image colorization system 104 can form clusters of colors, such as clusters of the colors in the LAB color space having the lightness value (L) of the point 114, or clusters of colors from the range of colors displayed by the color gamut 116. The image colorization system 104 can determine a respective color center for each cluster, and determine a respective color that is closest to the respective color center for each respective cluster. The image colorization system 104 can then display the respective color for each respective cluster in the color palette 122.

The number of clusters of colors, and hence the number of colors displayed by the color palette 122, can be user selectable. In one example, the color palette 122 displays seven suggested colors for the input image 112 based on the lightness value (L) of the point 114. Additionally or alternatively, the image colorization system 104 can constrain the color palette 122 to display a same number of colors as additional colors with different saturations displayed in the color saturation chart 120. For example, a user may select a value of seven via the user interface 106, and the color palette 122 and the color saturation chart 120 can each display seven colors.

Accordingly, the image colorization system 104 generates three representations of suggested colors for the input image 112 based on the lightness value (L) of the point 114 on the input image 112, including the color gamut 116 that displays a range of colors having the lightness value (L) of the point 114; the color saturation chart 120 that displays additional colors having different saturations of an indicated color of the color gamut 116; and the color palette 122 that displays a reduced version of the suggested colors for the digital image 112. A user can select any color displayed in the suggested colors region 110, such as a color displayed by the color gamut 116, the color saturation chart 120, or the color palette 122, and the image colorization system 104 can adjust a color of the input image 112 based on the user-selected color. In the example shown in FIG. 1, a user has selected a color displayed in the color saturation chart 120, denoted by user selection 124. For instance, the user can click on a color of the color saturation chart 120 with a mouse to select a color. Based on the selected color corresponding to the user selection 124, the user interface 106 displays the output image 126 in the image region 108, in which the baby's sweater and hat have been color adjusted.

The user can continue to select points on the input image 112 or the output image 126, and based on the lightness value (L) of the selected points, the suggested colors region 110 can update the colors of the color gamut 116, the color saturation chart 120, and the color palette 122. In this way, a user can quickly and efficiently add color to a digital image, since the image colorization system 104 suggests colors to the user via the suggested colors region 110 that are determined from a user-selected point on the image being edited itself, rather than merely suggesting default colors without regard for the image being edited.

Computing device 102 is also coupled to network 128, which communicatively couples computing device 102 with server 130. Network 128 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 130 may include one or more servers or service providers that provide services, resources, assets, or combinations thereof to computing device 102. Services, resources, or assets may be made available from server 130 to image colorization system 104, and stored at assets 132 of server 130. For instance, digital images, image editing applications, colorization applications, etc. in part or in whole can be stored at assets 132 and made available to computing device 102. Hence, image colorization system 104 can include any suitable asset stored at assets 132 of server 130.

Server 130 can include an image colorization support system 134 configurable to receive signals from computing device 102, process the received signals, and send the processed signals to computing device 102 to support adding color to digital images. For instance, computing device 102 may obtain a digital image and a specified point on the digital image (e.g., input image 112 and point 114, respectively) and communicate them along with any suitable data to server 130. Server 130, using the image colorization support system 134, may determine a lightness value (L) for the specified point in a LAB color space and suggested colors for the digital image based on the lightness value (L). The suggested colors can include a range of colors having the lightness value (L), and additional colors having the lightness value (L) and different saturations of colors in the range of colors. Server 130 may then send the suggested colors to computing device 102, which can display the suggested colors in one or more of a color gamut, color saturation chart, or color palette, as illustrated in the suggested colors region 110 of the user interface 106. Accordingly, the image colorization support system 134 of server 130 can include a copy of image colorization system 104.

Computing device 102 includes image colorization system 104 for adding color to digital images. Image colorization system 104 can be a standalone system, or a plug-in to an additional system. For example, image colorization system 104 can be included in an image editing system, such as by incorporating image colorization system 104 into Adobe Photoshop®. Image colorization system 104 includes a display 136, which can expose any suitable data used by or associated with image colorization system 104. In one example, display 136 displays a user interface for adding color to digital images, such as a user interface 106. Display 136 can include any suitable type of display, such as a touchscreen, liquid crystal display, plasma display, head-mounted display, wearable display, projector and screen, and the like.

The image colorization system 104 also includes processors 138, which can include any suitable type of processor, such as a graphics processing unit, central processing unit, digital signal processor, processor core, combinations thereof, and the like. Hence, the image colorization system 104 may be implemented at least partially by executing instructions stored in storage 140 on the processors 138. For instance, processors 138 may execute portions of image colorization application 144. The storage 140 can be any suitable type of storage accessible by or included in the image colorization system 104. The storage 140 stores data and provides access to and from memory included in the storage 140 for any suitable type of data. For instance, the storage 140 can include data used by or generated by the image colorization application 144.

Furthermore, the image colorization system 104 includes a transceiver module 142, which can be implemented to transmit and receive data using any suitable type and number of communication protocols. For instance, data within the image colorization system 104 can be transmitted to the server 130 with the transceiver module 142. Furthermore, data can be received from the server 130 with the transceiver module 142. The transceiver module 142 can also transmit and receive data between computing devices of the computing device 102. In one example, transceiver module 142 includes a low power wireless communication standard (e.g., a Bluetooth® protocol) for communicating data between computing devices of the computing device 102.

The image colorization system 104 also includes the image colorization application 144 that represents functionality configured to add color to, or adjust color of, digital images. The image colorization application 144 can be implemented as any type of module or component in software (e.g., as software instructions that are executable with processors 138), hardware, or combinations thereof, as a standalone application or as a module or component of another device application, and in any type of computing device. The image colorization application 144 can also include or have access to any suitable data for adding color to digital images, including image data 146, user interface data 148, LAB data 150, color gamut data 152, saturation data 154, and color palette data 156. In one example, this data is stored in storage 140 and made available to the image colorization application 144.

The image data 146 can include any suitable data related to digital images, such as files containing rasterized images (e.g., pixel values), images having vector graphics, an input image, an output image that has been recolored, a source of a digital image (e.g., a location from which the digital image is obtained, such as a database identifier), an identifier of the digital image (e.g., an image identification number), and the like. The image data 146 can also include a size of a digital image, such as a number of pixels, an indicator of a type of image (e.g., a first value may indicate a rasterized image and a second value may indicate an image represented by vector graphics), and the like. The image data 146 can also include metadata of a digital image, such as a date an image was captured, camera settings used to capture an image (e.g., aperture, shutter speed, light or sensor sensitivity setting, etc.), a name of a photographer who captured an image, an indicator of a type of camera or capture device used to capture an image, a location where an image was captured (e.g., coordinates such as longitude and latitude), and the like. The image data 146 can also include color data of a digital image, such as color histograms, a history of edits applied to an image to adjust the color of an image, LAB values of a digital image, RGB values of a digital image and the like.

The user interface data 148 can include any suitable data related to a user interface of image colorization system 104, such as user preferences (e.g., font size and style, locations and sizes of panels presented in a user interface, or preferred by users, and the like), data of users operating a user interface (e.g., user histories of edits including user-selections of colors, and user profiles of user features, such as gender, age, occupation, location, etc.), user interface configurations (e.g., different layouts, language options, etc.), and controls and adjusters (e.g., sliders, lists of user gestures, etc.) to control a user interface. The user interface data 148 can also include user-preferred representations of color gamuts, color saturations charts, color palettes, color containers (e.g., whether a user prefers rectangles or circles to display colors in a color saturation chart), and images exposed in a user interface, such as input images and output images that have been color adjusted. The user interface data 148 can also include user interface version numbers, lists of operating systems supported by various user interfaces, toolbar icons, speech libraries for voice-actuated commands and gestures, and the like.

The LAB data 150 can include any suitable data related to LAB values of digital images of colorization system 104, such as a lightness value (L) (e.g., a lightness value (L) of a user-designated point on a digital image), a list of colors in a LAB color space having a given lightness value (L), valid pairs of A values and B values for a lightness value (L) (e.g., a dense color set for the lightness value (L)), values removed from the dense color set to form the list of colors having the given lightness value (L), clusters of LAB values, representative colors of clusters of LAB values, a user-specified number of the clusters, and the like. The LAB data 150 can also include an implementation of an algorithm used to determine valid pairs of A values and B values for a lightness value (L), including a number of iterations of the algorithm, threshold values used to determine convergence of the algorithm, a transformation from a LAB color space to an RGB color space, and a transformation from the RGB color space back to the LAB color space.

The color gamut data 152 can include any suitable data related to a color gamut of colorization system 104, such as a range of colors displayed in a color gamut, a description of a Hilbert curve used to sort A values and B values of colors having a lightness value (L) of a specified point of a digital image, including an order of the Hilbert curve, and the colors having the lightness value (L) of the specified point that are sorted by the Hilbert curve (e.g., a list of sorted colors). The color gamut data 152 can also include a representation of an indicator of an indicated color of a color gamut (e.g., a current color of the color gamut, such as a default color or a user-selected color in the range of colors displayed by the color gamut), selectable options for the indicator of the indicated color (e.g., a slider tab, one or more triangles, a pair of arrows, a line bisecting the color gamut, etc.), a position of the indicated color in the range of colors displayed by the color gamut, a designator of whether the indicated color is a default color of the range of colors of the color gamut or a user-selected color of the range of colors of the color gamut, a history of indicated colors of a color gamut (e.g., colors of the color range corresponding to a position of the indicator on the color gamut), and the like. The color gamut data 152 can also include selectable options for the color gamut, such as a vertical array of the range of the colors, a horizontal array of the range of the colors, a pie with slices displaying the range of the colors, a ring (e.g., annulus filled with the range of the colors), stripes of portions of the range of the colors arranged in a grid, etc.

The saturation data 154 can include any suitable data related to a color saturation chart of colorization system 104, such as valid pairs of A values and B values for a lightness value (L), additional colors having the lightness value (L) and also having different saturations of an indicated color of a color gamut, a user-specified number of the additional colors, a user-specified color container for the additional colors (e.g., rectangles, squares, circles, etc.) in a color saturation chart, and the like. The saturation data 154 can also include a description of a region in an AB plane used by the colorization system 104 to determine the additional colors, including an angle of the A value and the B value of the indicated color of the color gamut in the AB plane, an upper line in the AB plane, a lower line in the AB plane, and distance of a threshold value separating the upper line and the lower line. Saturation data 154 can also include an order of the additional colors having the different saturations of the indicated color of the color gamut, such as an order determined from the distances of the A values and the B values of the additional colors in the AB plane to an origin of the AB plane.

The color palette data 156 can include any suitable data related to a color palette of colorization system 104, such as clusters of colors in a LAB color space having a lightness value (L) of a specified point on a digital image, a respective color center for each cluster, a respective color that is closest to the respective color center for each cluster, a user-specified number of the clusters, a number of colors in the clusters, and the like. The color palette data 156 can also include selectable options for the display of the color palette, such as a vertical array of color containers (e.g., squares) that each contain one of the colors that is closest to the color center for a cluster, a horizontal array of color containers, a pie with slices displaying the colors that are closest to the color centers for the clusters, a ring (e.g., annulus having sections filled with the colors that are closest to the color centers for the clusters), and the like.

Example Image Colorization System

Figure 2:
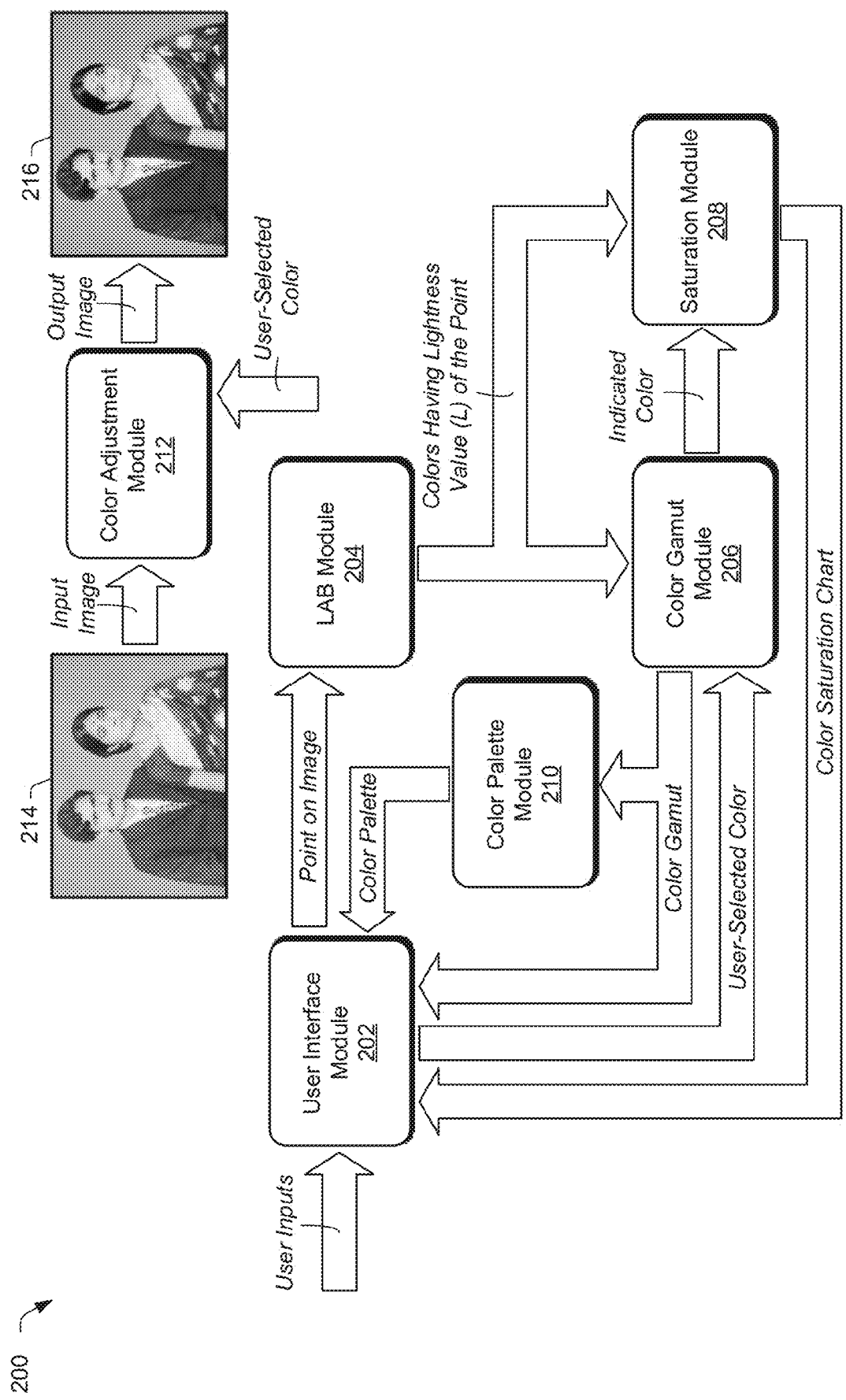
FIG. 2 illustrates an example system usable for adding color to digital images in accordance with one or more aspects of the disclosure.

FIG. 2 illustrates an example system 200 usable for adding color to digital images in accordance with one or more aspects of the disclosure. In this implementation, system 200 includes user interface module 202, LAB module 204, color gamut module 206, saturation module 208, color palette module 210, and color adjustment module 212. These modules can be implemented as any type of module or component in software (e.g., as software instructions that are executable with a processing system), hardware, or combinations thereof, as a standalone application or as a module or component of another device application, and in any type of computing device. System 200 is one example of image colorization system 104 that can be constructed using these modules. For instance, signals can be redefined, and modules can be modified, combined, divided, added, or removed to form a modified system, without altering the functionality of system 200. Accordingly, such modified systems are considered to be within the scope of the disclosure. Furthermore, for simplicity, system 200 is limited to these modules and a description of some of their interconnects. System 200 can, however, include any suitable signals and communications between modules omitted for simplicity. Such signals can include system clocks, counters, image indicators, sequence indicators, reset signals, and the like. In one example, system 200 can operate in real time (e.g., with no perceptible delay to a user). Accordingly, signals can be calculated by the modules of system 200 and communicated between the modules of system 200 without significant delay, so that a user can add color to a digital image with system 200 without perceptible delay to the user.

Moreover, system 200 can be implemented on any suitable device or devices. In one example, system 200 is implemented on one computing device (e.g., computing device 102 in FIG. 1). In another example, system 200 is implemented on more than one computing device. For instance, parts of system 200 can be implemented by a first computing device, such as one computing device of computing device 102 in FIG. 1, and other parts of system 200 can be implemented by an additional computing device of computing device 102. In one example, a server implements parts of system 200, such as server 130 in FIG. 1. A server can be remote, e.g., because it is not collocated with the first computing device. A server may be implemented to receive signals of system 200 from a computing device (e.g., computing device 102), process the received signals, such as with image colorization support system 134, and transmit results of the processing back to the computing device. Hence, image colorization support system 134 of server 130 in FIG. 1 can include system 200.

Additionally or alternatively, parts of system 200 can be implemented by an additional computing device that is collocated with a first computing device. For instance, one device of computing device 102 can be a first computing device, and another device of computing device 102 can be an additional, collocated computing device. The first computing device and the additional computing device can be operated by one or more users. Hence, system 200 can provide for multiple users within an environment to share data included in system 200.

Figure 6:
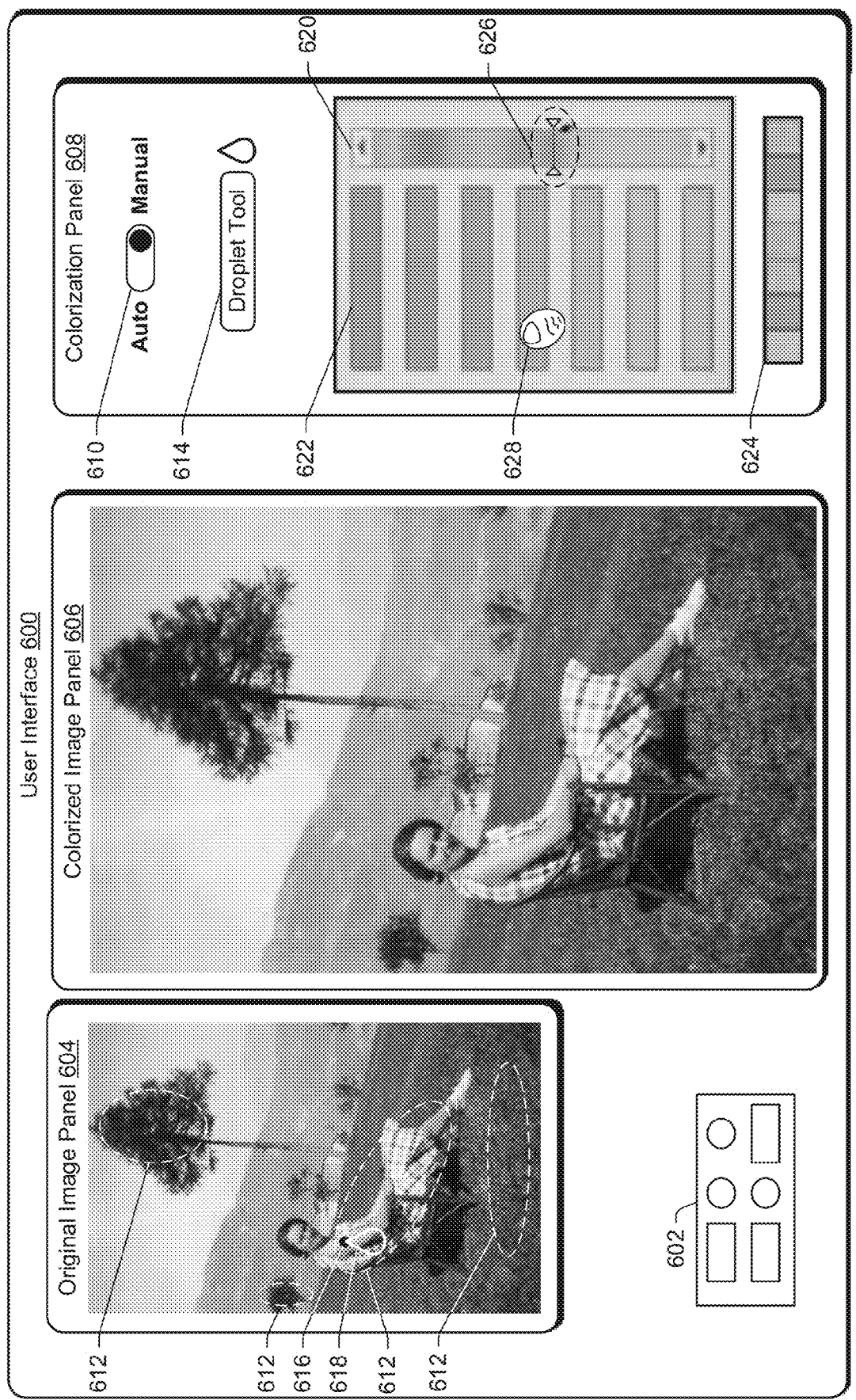
FIG. 6 illustrates an example user interface in accordance with one or more aspects of the disclosure.

User interface module 202 can be implemented to display a user interface, such as user interface 106 in FIG. 1 and user interface 600 in FIG. 6. User interface module 202 can display digital images and color suggestions for a digital image in the user interface, and receive user inputs via the user interface. User interface module 202 can receive any suitable user inputs via the user interface, including a designation of a point on a digital image and a designation of an object in the digital image, such as an object that includes the specified point. For instance, a user may designate an object in a digital image with an object segmentation tool, and click on a point of the object with a mouse. The user interface module 202 provides the user-specified point to LAB module 204, including any suitable information about the specified point, such as a location of the specified point on the digital image (e.g., pixel number, coordinates, etc.), values representing a pixel, such as RGB values, LAB values, and the like.

The LAB module 204 can be implemented to determine values in a LAB color space based on the specified point of the digital image. The LAB module 204 receives information of a point on the digital image from the user interface module 202, and can determine a lightness value (L) in a LAB color space of the point on the digital image, and colors in the LAB color space having the lightness value (L). To determine LAB values, the LAB module 204 can convert pixel content of a digital image to a LAB color space.

Figure 3:
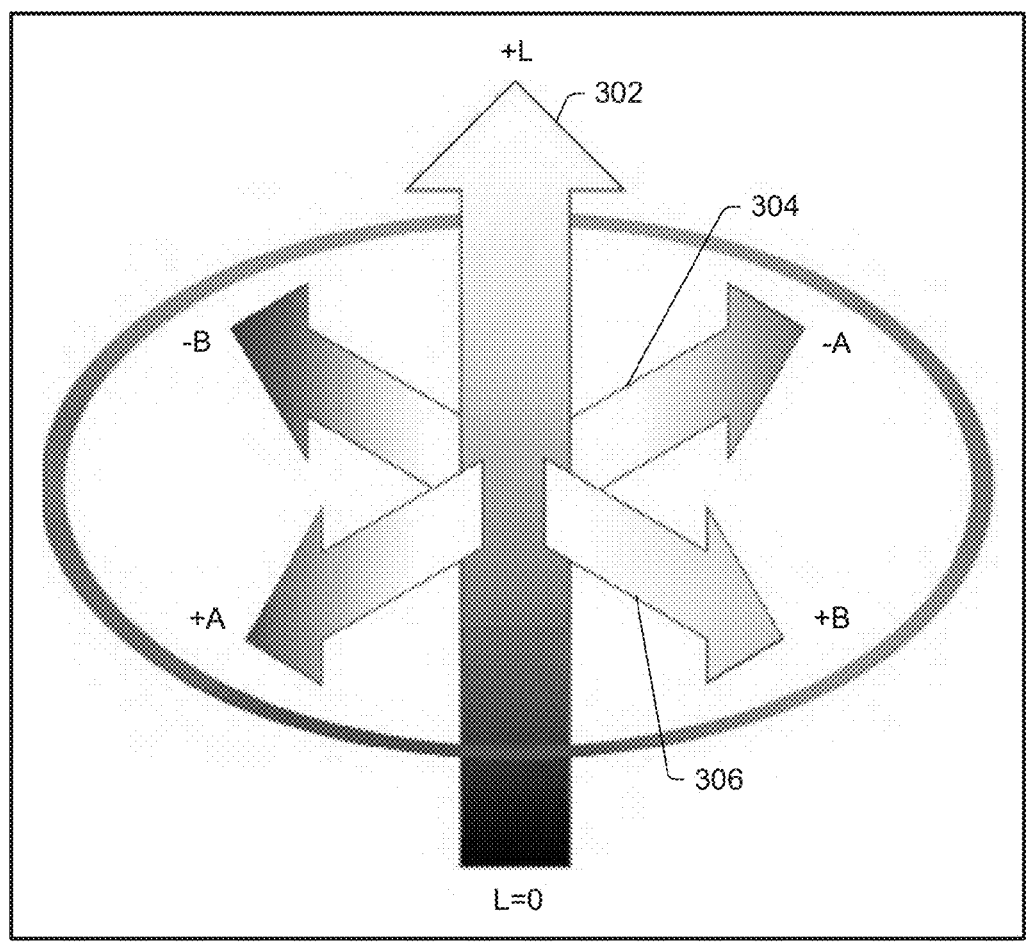
FIG. 3 illustrates an example color space in accordance with one or more aspects of the disclosure.

FIG. 3 illustrates an example color space 300 in accordance with one or more aspects of the disclosure. Color space 300 depicts a LAB color space, in which a first dimension 302 represents lightness (or luminance), a second dimension 304 represents green-red, and a third dimension 306 represents blue-yellow. A color in the color space 300 may thus be denoted as a three-tuple including a value of L for the lightness, and A and B values for the green-red and blue-yellow color components, respectively. The lightness dimension can be represented with lightness value (L) from L=0 to +L (e.g., L can be in the range of 0 to 255). A smaller value of lightness value (L) L denotes less lightness than a larger value of lightness value (L) L. The A value for the green-red component ranges from −A to +A (e.g., A can be in the range −256 to 255). Negative values of A indicate amounts of green, and positive values of A indicate amounts of red. The B value for the blue-yellow component ranges from −B to +B (e.g., B can be in the range −256 to 255). Negative values of B indicate amounts of blue, and positive values of B indicate amounts of yellow.

For a specified point on a digital image provided to the LAB module 204 from the user interface module 202, the LAB color module can determine colors in the LAB color space 300 having the lightness value (L) of the specified point. Note that not all pairs of A values and B values (A,B pairs) are valid for a given lightness value (L), since not all A,B pairs can be combined with a given lightness value (L) to form a color that can be represented in an RGB color space. Since not all pairs of A values and B values are valid for the lightness value (L) of the specified point, the LAB module 204 can determine the valid pairs of A values and B values for the lightness value (L), and store them as a dense color set. The LAB module 204 can determine the dense color set of valid A,B pairs for the lightness value (L) iteratively, by transforming LAB values to RGB values and the RGB values back to LAB values, and repeating the transformations until the transformed LAB values converge and include the valid pairs of A values and B values for the lightness value (L).

For example, let $L^{point}$ be the lightness value (L) of the specified point on the digital image provided from the user interface module 202. The LAB module 204 can form colors from this lightness value (L) and all possible pairs of A values and B values, denoted by the values of "$L^{point}AB$". The LAB module 204 can transform these values to RGB values with a first transformation, and then transform the results of the first transformation back to the LAB color space 300 with a second transformation to form colors denoted by values "$L^{new}A^{new}B^{new}$". The LAB module 204 can then construct new LAB values from the results of the second transformation and the lightness value (L) of the point by concatenating the lightness value (L) of the point with the pairs of $A^{new}$ values and $B^{new}$ values from the second transformation. For example, the LAB module 204 can construct new LAB values as "$L^{point}A^{new}B^{new}$". The LAB module 204 can then repeat the steps of transforming from LAB values to RGB values and back to LAB values with the colors formed by concatenating the lightness value (L) of the point with the pairs of A values and B values generated on the previous iteration, e.g., "$L^{point}A^{new}B^{new}$". Hence, the LAB module 204 can determine LAB values in the LAB color space having the lightness value (L) of the point on the digital image to be color adjusted from A,B pairs in the LAB color space that can be combined with the lightness value (L) to form a color representable in an RGB color space. In other words, the LAB module 204 can determine colors representable in an RGB color space based on combinations of valid A,B value pairs with the lightness value (L) in the LAB color space.

The LAB module 204 can repeat these steps any suitable number of times until the LAB values converge. In one example, the LAB module 204 determines that the LAB values have converged when the differences between A values and B values of a current iteration and A values and B values of a previous iteration are below a threshold value (e.g., 0.1), for a prescribed number of iterations (e.g., ten iterations in a row) for all pairs of A values and B values. The A values and B values generated by this iterative process represent the valid pairs of A values and B values for the lightness value (L) of the point, and the LAB module 204 can represent these valid pairs of A values and B values and the lightness value (L) of the point as a dense color set.

The dense color set can include a significant number of valid pairs of A values and B values for a lightness value (L). Hence, the LAB module 204 can determine colors in the LAB color space having the lightness value (L) from the dense color set, e.g., from a subset of colors of the dense color set. In one example, the LAB module 204 removes at least some colors of the dense color set to determine colors in the LAB color space having the lightness value (L) of the point. For instance, the LAB module 204 can cluster the LAB values from the dense color set into color clusters. Each color cluster therefore includes colors having the lightness value (L) of the point with valid pairs of A values and B values. The LAB module 204 can then determine a representative LAB value for each cluster as one of the colors in the LAB color space having the lightness value (L). In one example, the LAB module 204 determines 529 clusters of colors from the dense color set having valid pairs of A values and B values for the lightness value (L), and 529 colors in the LAB color space having the lightness value (L) (e.g., a respective color for each cluster of the 529 clusters). The LAB module 204 can represent the 529 colors in a list of colors, such as a list of LAB values of the colors.

Returning to FIG. 2, the LAB module 204 provides a list of the colors having the lightness value (L) of the point (e.g., a list of 529 LAB values) to color gamut module 206 and saturation module 208. Data used by or calculated by the LAB module 204 can be stored in storage 140, accessed as LAB data 150 in FIG. 1, and be made available to the modules of system 200.

The color gamut module 206 can be implemented to generate a color gamut that includes a range of the colors having the lightness value (L) of the point. The color gamut module 206 receives the colors having the lightness value (L) of the point from the LAB module 204 (e.g., a list of 529 LAB values), and can sort the colors to form sorted colors as the range of the colors for display in the color gamut. In one example, the color gamut module 206 sorts A values and B values of the colors having the lightness value (L) with a two-dimensional Hilbert curve to form sorted colors. The Hilbert curve is a fractal, space-filling curve that smooths the transitions between the sorted colors. Since the colors provided from the LAB module 204 have the same lightness value (L) (e.g., the lightness value (L) of the point), the LAB module 204 uses a two-dimensional Hilbert curve, rather than a three-dimensional Hilbert curve, and sorts the colors by sorting the A values and the B values of the colors.

Figure 4:
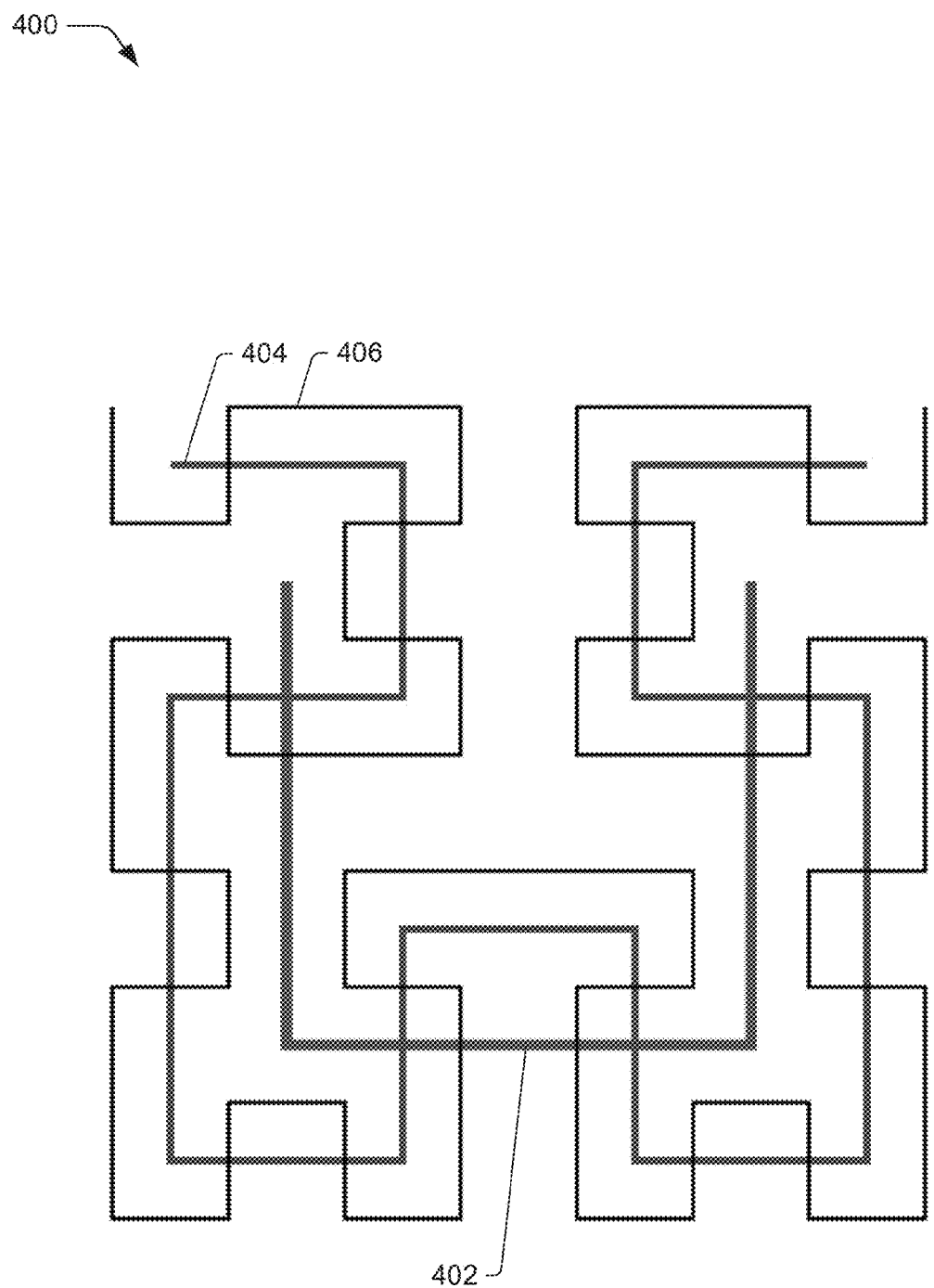
FIG. 4 illustrates example Hilbert curves in accordance with one or more aspects of the disclosure.

FIG. 4 illustrates example Hilbert curves 400 in accordance with one or more aspects of the disclosure. A Hilbert curve is a continuous, fractal, space-filling curve that grows exponentially with the order of the curve, while remaining bounded by a square of finite area. The Hilbert curves 400 illustrate a first order Hilbert curve 402 (e.g., a "U shape"), a second order Hilbert curve 404, and a third order Hilbert curve 406. The second order Hilbert curve 404 is formed by propagating the first order Hilbert curve 402 over a square that contains the first order Hilbert curve 402. The third order Hilbert curve 406 is formed by propagating the second order Hilbert curve 404 over a square that contains the second order Hilbert curve 404.

To sort the colors having the lightness value (L) of the point, the color gamut module 206 can apply the colors having the lightness value (L) of the point to the first order Hilbert curve 402, e.g., along the length of the curve. For instance, the color gamut module 206 can apply 529 colors corresponding to the lightness value (L) of the point along the length of the first order Hilbert curve 402. The color gamut module 206 can then propagate the first order Hilbert curve 402 for any suitable order, and determine sorted colors from the colors along the length of the propagated Hilbert curve. In one example, the color gamut module 206 propagates the Hilbert curve by an order of six to determine the sorted colors. By sorting the colors with the Hilbert curve, the color gamut module 206 smooths the transitions between the sorted colors.

Returning again to FIG. 2, the color gamut module 206 can display the sorted colors as a range of colors in a color gamut in a user interface generated by the user interface module 202. The color gamut 116 in FIG. 1 is an example of a color gamut generated by the color gamut module 206 that displays a range of colors that are sorted using a Hilbert curve as described above. The color gamut module 206 can generate a color gamut that also includes an indicator of an indicated color (e.g., a current color) of the color gamut. In one example, a user can move the indicator along the color gamut to select a color of the color gamut. If a user has not selected a color displayed by the color gamut, the color gamut module 206 can determine the indicated color of the color gamut to be a default color. For example, the color gamut module 206 can set the indicated color of the color gamut to be a first color in a list of the sorted colors generated by applying the Hilbert curve to the colors having the lightness value (L) of the point.

The color gamut module 206 can also receive an indication of a user-selected color from the user interface module 202. For instance, the user interface module 202 may generate a user interface that displays a color gamut generated by the color gamut module 206, and a user may move the indicator of the indicated color of the color gamut to select a user-selected color of the color gamut. For example, the user may move a slider along the length of the color gamut to select a color of the color gamut. Based on the user-selection, the color gamut module 206 may change the indicated color of the color gamut from a default color to the user-selected color. Accordingly, the color gamut module 206 can determine the indicated color of a color gamut to be a default color in the range of colors displayed by the color gamut until a user selects a color of the color gamut, at which time the color gamut module 206 can update the indicated color to the user-selected color.

The color gamut module 206 provides a color gamut with a range of colors having the lightness value (L) of the point to user interface module 202, and an indicated color of the color gamut to the saturation module 208. Data used by or calculated by the color gamut module 206 can be stored in storage 140, accessed as color gamut data 152 in FIG. 1, and be made available to the modules of system 200.

The saturation module 208 can be implemented to generate a color saturation chart. The saturation module 208 receives the colors having the lightness value (L) of the point from the LAB module 204 (e.g., a list of 529 LAB values) and an indicated color of a color gamut from the color gamut module 206, and can be implemented to determine a color saturation chart that includes additional colors having the lightness value (L) of the point and different saturations of the indicated color of the color gamut.

The saturation module 208 can determine the additional colors having the lightness value (L) and different saturations of the indicated color in any suitable way. In one example, the saturation module 208 determines a region in an AB plane (e.g., a plane of A values and B values) that includes the A value and the B value of the indicated color and corresponds to valid pairs of A values and B values for the lightness value (L). The saturation module 208 can select A values and B values from the region in the AB plane, and form the additional colors having the lightness value (L) and the different saturations of the indicated color from the selected A values and B values from the region.

Figure 5:
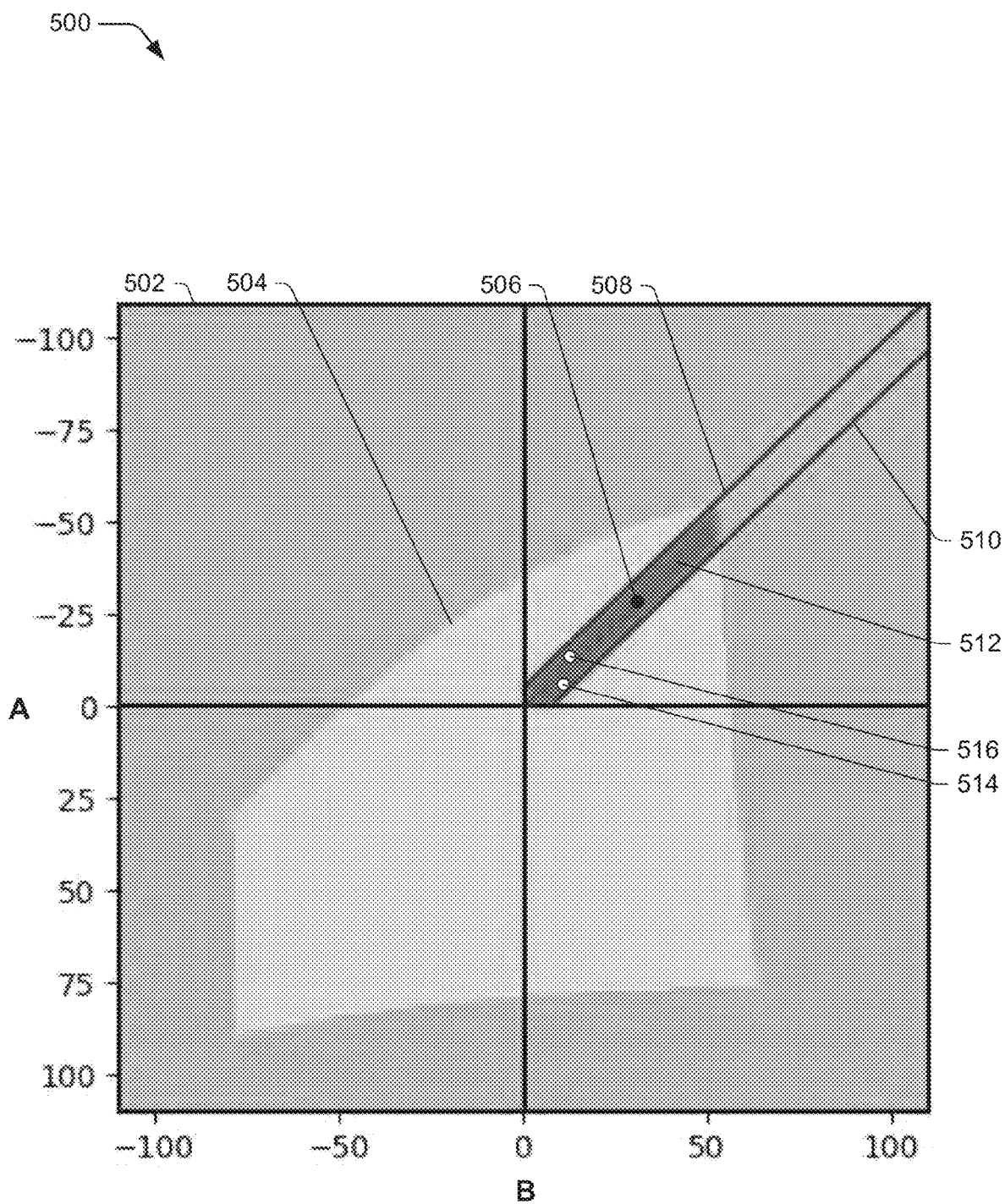
FIG. 5 illustrates an example geometry in accordance with one or more aspects of the disclosure.

For instance, FIG. 5 illustrates an example geometry 500 in accordance with one or more aspects of the disclosure. The geometry 500 includes an AB plane 502 in which A values and B values span a range of approximately −100 to +100. The geometry 500 also includes an area 504 of the AB plane 502 that includes valid pairs of A values and B values for a lightness value (L) of L=50. For example, the area 504 includes, for the lightness value (L) of the point on a digital image, the valid pairs of A values and B values in a dense color set determined by the LAB module 204, as previously described. For instance, the area 504 includes A,B pairs in the LAB color space that can be combined with the lightness value (L) to form a color representable in an RGB color space. For clarity, the area 504 is denoted as yellow in FIG. 5.

The geometry 500 also includes the point 506 in the AB plane 502. The point 506 represents an A value and a B value of a user-selected point on a digital image, such as the point 114 in FIG. 1. The vector of the point 506 is denoted in the AB plane 502 as a red dashed line, which defines an angle of the point 506 in the AB plane, such as an angle relative to the horizontal dimension or vertical dimension (e.g., the B dimension or the A dimension, respectively) of the AB plane. Based on the angle of the point 506 and the location of the point 506 in the AB plane, the saturation module 208 can determine an upper line 508 and a lower line 510 that are parallel and have the same angle as the point 506. Moreover, the saturation module 208 can determine the upper line 508 and the lower line 510 based on a threshold value, such as a distance that separates the upper line 508 and the lower line 510. An example distance of the threshold value can be ten. The point 506 is centered between the upper line 508 and the lower line 510, so that the upper line 508 and the lower line 510 are equidistant along a normal to the upper line 508 and the lower line 510 from a location in the AB plane of the point 506.

The saturation module 208 can determine the region 512 (shaded blue in FIG. 5 for clarity) from an intersection of the area 504 representing the valid pairs of A values and B values for the specified lightness value (L) and an interior formed from the upper line 508 and the lower line 510. The saturation module 208 can select pairs of A values and B values from the region 512, such as a default number of pairs of A values and B values or a user-specified number of pairs of A values and B values, and determine an additional color having the lightness value (L) of the point in the digital image and a different saturation of the indicated color of the color gamut from each pair of A value and B value selected from the region 512. The points 514 and 516 denote two pairs of A values and B values in the region 512 selected by the saturation module 208 to determine additional colors having the lightness value (L) of the point in the digital image and different saturations of the indicated color of the color gamut. For instance, saturation module 208 can concatenate the lightness value (L) of the point in the digital image with an A value and B value selected from the region 512 (e.g., one of the points 514 and 516) to determine an additional color having the lightness value (L) of the point in the digital image and a different saturation of the indicated color of the color gamut.

The saturation module 208 can generate a color saturation chart that displays the additional colors having the lightness value (L) and different saturations of the indicated color. The color saturation chart 120 in FIG. 1 is an example of a color saturation chart generated by the saturation module 208. The saturation module 208 can populate a color container, such as a rectangle, circle, square, etc., of the color saturation chart with a respective color of the additional colors having the lightness value (L) and different saturations of the indicated color of the color gamut.

In one example, the saturation module 208 determines an order of the additional colors based on distances of points corresponding to the A values and the B values of the additional colors to an origin of the AB plane 502, and generates the color saturation chart to display the additional colors at positions determined from the order. For instance, the color saturation chart can display rectangles filled with a respective color of the additional colors vertically (e.g., one rectangle above another rectangle), with a position in the vertical display determined from the order. For example, a rectangle filled with an additional color having an A value and a B value closer to the origin of the AB plane 502, such as the point 514, can be displayed underneath another rectangle filled with an additional color having an A and a B value further from the origin of the AB plane 502, such as the point 516.

Returning again to FIG. 2, the saturation module 208 provides a color saturation chart to the user interface module 202. Data used by or calculated by the saturation module 208 can be stored in storage 140, accessed as saturation data 154 in FIG. 1, and be made available to the modules of system 200.

The color palette module 210 can be implemented to generate a color palette that includes a reduced version of the suggested colors for a digital image determined by system 200. The color palette 122 in FIG. 1 is an example of a color palette generated by the color palette module 210. The color palette module 210 can generate a color palette that indicates at a quick glance and high level a subset (e.g., reduced version) of the range of colors displayed in a color gamut generated by the color gamut module 206. Accordingly, the color palette module 210 receives a color gamut from the color gamut module 206 and can determine colors for a color palette from the color gamut. Additionally or alternatively, the color palette module 210 can receive a color list from the LAB module 204 (e.g., a list of LAB values for colors having a same lightness value (L) as a point on a digital image) and can determine colors for a color palette from the color list.

The color palette module 210 can determine the colors of the color palette in any suitable way. In one example, the color palette module 210 clusters colors (e.g., sorted colors that are displayed in a color gamut of color gamut module 206) into clusters of colors, and determines a respective color center for each cluster. The color palette module 210 can then determine a respective color that is closest to the respective color center for each respective cluster, and populate the colors of the color palette with the determined respective colors for the clusters. Hence, the color palette may be useful to novice users by providing a simplified and non-confusing view of suggested colors for a digital image.

In one example, the number of colors displayed in a color palette of the color palette module 210 is user configurable. For example, a user may select via a drop-down menu in a user interface of the user interface module 202 a number of colors that are included in the color palette. Additionally or alternatively, the system 200 may set the number of colors included in the color palette to be the same as the number of additional colors displayed in a color saturation chart generated by the saturation module 208.

The color palette module 210 provides a color palette to user interface module 202. Data used by or calculated by the color palette module 210 can be stored in storage 140, accessed as color palette data 156 in FIG. 1, and be made available to the modules of system 200.

Accordingly, the user interface module 202 can generate a user interface that includes at least one of three representations of suggested colors for a digital image based on the lightness value (L) of a point on the digital image, including a color gamut that displays a range of colors having the lightness value (L) of the point, a color saturation chart that displays additional colors having different saturations of an indicated color of the color gamut, and a color palette that displays a reduced version of the suggested colors for the digital image. A user can select a color displayed by the color gamut, the color saturation chart, or the color palette, and the color adjustment module 212 can be implemented to adjust a color of the digital image (e.g., add color to the digital image) based on the user-selected color.

The color adjustment module 212 can include any suitable function to adjust the color of a digital image based on a user-selected color, such as a neural network. The color adjustment module 212 can provide the digital image and a representation of the user-selected color (e.g., a color container or image patch filled with the user-selected color) as inputs to the neural network. The color adjustment module 212 can also provide an indication of an object mask to the neural network. For instance, the user may segment an object in the digital image, such as by tracing the border of the object, to indicate to adjust the color of the object in the digital image without adjusting the color of other objects in the digital image. The color adjustment module 212 may generate a mask for the user-designated object that distinguishes pixels of the digital image that correspond to the object from pixels that do not correspond to the digital image, and provide the mask as an additional input to the neural network. The neural network can adjust the color of the digital image, e.g., the pixels of an object designated by the mask, and generate an output image that is color adjusted based on the user-selected color.

In an example, when the neural network is not provided a mask of an object, the neural network can adjust the color of the entire digital image based on a user-specified color. Additionally or alternatively, if the neural network is provided neither a mask of an object or a representation of the user-selected color, the neural network can adjust the color of the entire digital image in an automatic mode in which the neural network may try to match the colors of the digital image to colors of training images used to train the neural network.

In one example, the color adjustment module 212 includes a convolutional neural network that includes an encoder and decoder. An encoder can pass a digital image through a series of layers that progressively downsample (e.g., by a factor of two) and perform convolutions using spatial filters to generate a feature map. A color container with the user-selected color and a mask of an object to be color adjusted can be concatenated with the feature map generated by the encoder to form a concatenated feature map that can be supplied as input to a decoder. In the decoder, the process of the encoder is reversed, and layers of the decoder can progressively upsample the concatenated feature map (e.g., by a factor of two) and perform deconvolutions using spatial filters to reconstruct the digital image having the color adjustments.

Hence, a user can use system 200 for adding color to a digital image iteratively, by working on different regions of the digital image (e.g., different objects of the digital image) successively. For each object selected by the user and point indicated on the object, the system 200 can display suggested colors based on the lightness of the point, including a color gamut, color saturation chart, and color palette as previously described. The user can select a color on any one of the color gamut, color saturation chart, or color palette, and the system 200 can add color to the object of the digital image selected by the user based on the user-selected color. By repeating this process for different objects, the user can adjust the color of an image quickly and efficiently based on suggested colors for the digital image itself, rather than generic recommendations of colors.

For instance, digital image 214 is an example of a black and white image that is input to the system 200, and digital image 216 is an example of an output image generated by the system 200 by adding colors to the digital image 214. The digital image 214 and the digital image 216 can be displayed in a user interface of the user interface module 202. In the example in FIG. 5, a user has selected objects such as the background of the digital image 214, the man's jacket, the woman's sari, etc., and for each object, selected a color suggested by the system 200 for a user-specified point on the object. Based on the user-specified colors and objects, the color adjustment module 212 generates the output image 216, in which the objects have had color added to them according to the user specified colors.

The systems described herein constitute an improvement over conventional image colorization systems that suggest colors for a digital image being edited that are not based on the digital image, but instead are generic or default colors suggested without regard to the digital image being edited. Rather, the systems described herein suggest colors for adding color to a digital image based on the digital image itself. Hence, the systems described herein suggest colors that represent a good starting point for adding color to the digital image, and are thus efficient to use and can produce colorization results superior to conventional image colorization systems.

Moreover, the systems described herein can determine colors having a same lightness value (L) in a LAB color space as a user-specified point on the digital image, and determine more colors to suggest based on the lightness value (L) than is humanly possible to visualize at any one time. By generating various representations of the colors to suggest to a user, including a color gamut that displays a range of colors having the lightness value (L) of the user-specified point, a color saturation chart that displays additional colors having different saturations of an indicated color of the color gamut, and a color palette that displays a reduced version of the suggested colors for the digital image, the systems described herein suggest colors for a digital image to a user with color representations that make it easy for the user to navigate and do not overwhelm the user with color suggestions, despite that the systems have generated more colors than is humanly possible to contemplate at any one time. Hence, the systems described herein can achieve colorization results that are simply not possible using conventional image colorization systems. Moreover, because the systems described herein determine colors to suggest based on a lightness value (L) of a point on the digital image, the image colorization system can suggest colors for black-and-white images and color images.

Example User Interface

FIG. 6 illustrates an example user interface 600 in accordance with one or more aspects of the disclosure. The user interface 600 is an example of a user interface that can be generated by an image colorization system, such as the image colorization system 104 in FIG. 1 or the system 200 in FIG. 2. The user interface 600 includes a control panel 602, an original image panel 604, a colorized image panel 606, and a colorization panel 608. The original image panel 604 and the colorized image panel 606 are examples of panels that can be displayed in an image region of the user interface 600, such as image region 108 of FIG. 1, and the colorization panel 608 is an example of a panel that can be displayed in a suggested colors region of the user interface 600, such as suggested colors region 110 of FIG. 1.

The control panel 602 can include any suitable control or option regarding the user interface 600. The control panel 602 is generally shown as a collection of rectangles and circles representing sliders, buttons, tabs, switches, knobs, and the like which a user may select, adjust and otherwise use for adding color to digital images and control user interface 600. Examples of control options in control panel 602 include adjusters for brightness, contrast, selection of filters, crop, overlay, import, export, font type, size and color, zoom, object segmentation, saving the digital image, selection of a drawing tool, and the like.

The original image panel 604 can display an input image, e.g., a digital image to be color adjusted. In the example in FIG. 6, the original image panel 604 displays a black and white image of a woman sitting in front of a mountain landscape. The colorized image panel 606 can display an output image that has been color adjusted, such as a colorized version of the black and white digital image displayed in the original image panel 604.

For example, the colorization panel 608 includes a switch 610 to select between an automatic or a manual mode of colorization. When in an automatic mode, an entire image may be color adjusted. For instance, the switch 610 could be placed into automatic position and in response, the colorization panel 608 can display a "color now" button (not shown in FIG. 6). In response to a user selecting the "color now" button, the image displayed in the original image panel 604 can be color adjusted by an image colorization system, such as by applying the image displayed in the original image panel 604 as an input to a neural network that has been trained to add color to digital images by matching the color of the digital images to colors of training images used to train the neural network. Hence, a user may first colorize a black and white image in automatic mode, and then correct the resulting colorized image in a manual mode.

In the example in FIG. 6, the switch 610 has been placed into a manual position and the user has selected multiple objects in the image displayed in the original image panel 604, such as with an object segmentation tool of the user interface 600. The selected objects are designated in the original image panel 604 with ellipses 612, and include the woman, a foreground that contains grass, and trees behind the woman. In one example, the image colorization system groups the woman, the foreground that contains grass, and the trees behind the woman into a single object segmented by the user, and can add colors to the pixels of the digital image corresponding to this single object made up of the woman, the foreground that contains grass, and the trees behind the woman, without adding color to pixels of other objects in the digital image (e.g., the mountains in the background of the digital image).

In response to the switch 610 being placed into a manual position in FIG. 6, the colorization panel 608 displays droplet tool selection 614. A user can enable the droplet tool selection 614, e.g., by clicking on it, so that the user can designate a point on the digital image displayed in the original image panel 604 and the image colorization system displays an indicator of the point, such as a droplet, on the digital image. For instance, a user has enabled the droplet tool selection 614 in the user interface 600 and clicked on the point 616 on the woman in the digital image displayed in the original image panel 604. In response to the user clicking on the point 616, the droplet selection tool 614 causes a droplet 618 to be displayed on the digital image in the original image panel 604 at the point 616. The droplet 618 locates the point 616, such as by pointing to the point 616. The droplet 618 is one example of a color indicator that can locate the point 616 on the digital image in the original image panel 604. Other examples of a color indicator that can be displayed in the user interface 600 when the droplet tool selection 614 is enabled include a triangle, an arrow, a circle centered on the point 616, and the like. In one example, a color indicator (e.g., the droplet 618) can be populated with a color displayed in the colorization panel 608, such as a user-selected color. For instance, the droplet 618 can be filled with a user-selected color, so that the droplet 618 displays the user-selected color in the context of the digital image being edited, e.g., overlaid on top of the digital image. Hence, the droplet 618 can act as a preview for a user-selected color on a digital image without actually adjusting the color of the digital image.

In response to the user designating the point 616 on the digital image in the original image panel 604, the colorization panel 608 can display suggested colors for the digital image based on the lightness value (L) in a LAB color space of the point 616, as previously described. For instance, the colorization panel 608 displays three representations of suggested colors, including color gamut 620, color saturation chart 622, and color palette 624. The color gamut 620 is an example of a color gamut generated by the color gamut module 206, the color saturation chart 622 is an example of a color saturation chart generated by the saturation module 208, and the color palette 624 is an example of a color palette generated by the color palette module 210.

In the example in FIG. 6, the user has moved a slider of the color gamut 620 to a position of the color gamut 620 in the ellipse 626, so that the indicated color of the color gamut 620 is a used-selected color. The slider in the ellipse 626 indicates the indicated color as the color of the color gamut 620 that is between the triangles of the slider. For instance, the indicated color of the color gamut 620 is the color of the color gamut 620 at the dashed line between the triangles of the slider in the ellipse 626. In one example, responsive to the user moving the slider of the color gamut 620 to select a color in the ellipse 626 of the color gamut 620, the image colorization system populates the droplet 618 with the indicated color of the color gamut 620 (e.g., the user-selected color), so that the indicated color of the color gamut 620 can be seen by the user in the context of the digital image being edited (not shown in FIG. 6).

Based on the user moving the slider of the color gamut 620 to select a color in the ellipse 626 of the color gamut 620, the color saturation chart 622 displays seven rectangles as color containers that are vertically stacked and display additional colors having the lightness value (L) of the point 616 and different saturations of the indicated color of the color gamut 620. For example, the user can continue to move the slider of the color gamut 620 to update the indicated color of the color gamut 620, and the color saturation chart 622 in response to the user movement of the slider can continue to update the additional colors displayed in the color saturation chart 622 so that they have the lightness value (L) of the point 616 and different saturations of the updated, indicated color of the color gamut 620.

The user can select a color to add to the digital image in the original image panel 604 via any of the color gamut 620, the color saturation chart 622, and the color palette 624. In the example in FIG. 6, the user has selected one of the seven additional colors displayed in the color saturation chart 622, designated by the user touch 628. For example, the user touch 628 indicates that the user has selected the additional color displayed by the center rectangle of the seven rectangles of the color saturation chart 622. Based on the user-selected color from the user touch 628, the image colorization system adds color to the digital image displayed in the original image panel 604 and generates the output image displayed in the colorized image panel 606. In the output image displayed in the colorized image panel 606, the objects corresponding to the ellipses 612 have been colored based on the user-selected color corresponding to the user touch 628, and other objects of the output image have not been color adjusted. For example, the woman, the foreground that contains grass, and the trees behind the woman have had color added to them based on the user-selected color of the user touch 628, and the mountains in the background of the output image remain black and white as they appear in the digital image displayed in the original image panel 604.

Example Procedures

Figure 7:
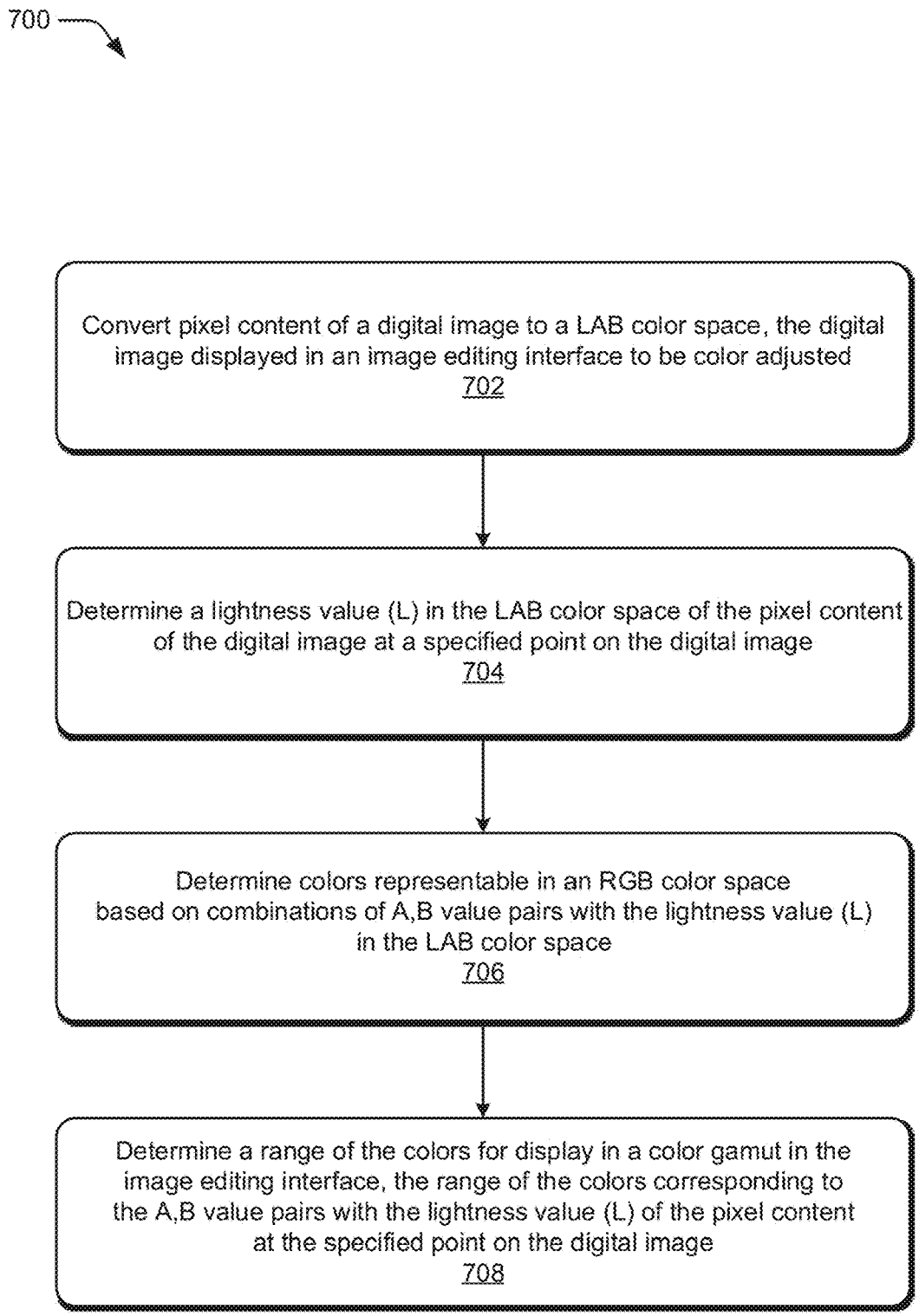
FIG. 7 illustrates a flow diagram depicting an example procedure in accordance with one or more aspects of the disclosure.

FIG. 7 illustrates an example procedure 700 for adding color to digital images in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 130 of FIG. 1 that makes use of an image colorization system, such as system 200 or image colorization system 104. An image colorization system implementing procedure 700 may be an independent application that has been installed on the computing device, a service hosted by a service provider that is accessible by the computing device, a plug-in module to the computing device, or combinations thereof.

Pixel content of a digital image is converted to a LAB color space, the digital image displayed in an image editing interface to be color adjusted (block 702). For example, the user interface module 202 can display, in an image editing interface of a computing device, such as the user interface 106 in FIG. 1, a digital image to be color adjusted. The digital image can be a black and white image. In one example, the digital image is a colorized image formed by adding color to a black and white image, such as with a neural network in an automatic colorization mode that adds color to the whole digital image to match colors of one or more training images used to train the neural network. The LAB module 204 can convert pixel content of the digital image to be color adjusted to a LAB color space. In one example, the LAB module 204 converts pixel content of the digital image to be color adjusted from an RGB color space to a LAB color space with a transformation that converts RGB values of pixels of the digital image to LAB values in the LAB color space.

A lightness value (L) in the LAB color space of the pixel content of the digital image at a specified point on the digital image is determined (block 704). For example, the user interface module 202 can receive, via the image editing interface, a user selection specifying a point on the digital image to be color adjusted. In one example, the user clicks on the specified point with a mouse. Additionally or alternatively, the user can touch a touchscreen with a stylus or finger at the specified point. The LAB module 204 can then determine a lightness value (L) in the LAB color space of the pixel content of the digital image at the specified point on the digital image, such as from a LAB value in the LAB color space for the specified point. In one example, the LAB module 204 determines the lightness value (L) of the specified point from the LAB values in the LAB color space formed by transforming RGB values representing content of the digital image to the LAB values.

Colors representable in an RGB color space are determined based on combinations of A,B value pairs with the lightness value (L) in the LAB color space (block 706). For example, the LAB module 204 can determine colors representable in an RGB color space based on combinations of A,B value pairs with the lightness value (L) in the LAB color space. In one example, the LAB module 204 determines LAB values in the LAB color space having the lightness value (L) of the point on the digital image to be color adjusted from the A,B value pairs in the LAB color space that can be combined with the lightness value (L) to form the colors representable in an RGB color space. For instance, the LAB module 204 can iteratively determine the LAB values by transforming the LAB values to RGB values and the RGB values back to LAB values, replacing the L values of the LAB values with the lightness value (L) corresponding to the pixel content of the specified point, and repeating the transformations until the transformed LAB values converge and include valid A,B value pairs, as described above. In one example, the LAB module 204 determines a dense color set of the LAB values that includes valid A values and B values in the LAB color space for the lightness value (L). The valid A values and B values correspond to the A,B value pairs in the LAB color space that can be combined with the lightness value (L) to form a color representable in an RGB color space.

A range of the colors is determined for display in a color gamut in the image editing interface, the range of the colors corresponding to the A,B value pairs with the lightness value (L) of the pixel content at the specified point on the digital image (block 708). In an example, the color gamut module 206 determines a range of the colors for display in a color gamut in the image editing interface, the range of the colors corresponding to the A,B value pairs with the lightness value (L) of the pixel content at the specified point on the digital image. The user interface module 202 can display, in the color gamut of the image editing interface, the range of the colors corresponding to the A,B value pairs with the lightness value (L) of the pixel content at the specified point on the digital image.

In one example, the LAB module 204 forms clusters of LAB values (e.g., the combinations of the A,B value pairs with the lightness value (L)), and the color gamut module 206 can determine, for each cluster of the clusters, a respective color of the range of the colors for the color gamut. Additionally or alternatively, the color gamut module 206 can sort the A,B value pairs with a two-dimensional Hilbert curve to form sorted colors, and the user interface module 202 can display the range of the colors in the color gamut including displaying the sorted colors.

In one example, the color palette module 210 clusters the sorted colors into clusters of the sorted colors, and determines a respective color center for each cluster of the clusters of the sorted clusters. The color palette module 210 can then determine a respective sorted color that is closest to the respective color center for each respective cluster of the sorted clusters for display in the image editing interface. The user interface module 202 can display, in the image editing interface, the color palette that includes the respective sorted color for each respective cluster of the sorted clusters.

In an example, the color gamut module 206 determines an indicated color of the range of the colors of the color gamut, and the saturation module 208 determines additional colors having different saturations of the indicated color. The user interface module 202 can display, in the image editing interface, the additional colors having the different saturations in a color saturation chart. For instance, the saturation module 208 can determine an A value and a B value in the LAB color space of the indicated color, an angle of the A value and the B value of the indicated color in an AB plane, and a region in the AB plane based on the angle of the A value and the B value of the indicated color and a threshold value. The saturation module 208 can then determine the additional colors having the different saturations of the indicated color by selecting the additional colors from the colors in the LAB color space having the lightness value (L) and having the A,B value pairs that are in the region in the AB plane.

Additionally or alternatively, the saturation module 208 can determine an order of the additional colors based on distances of points corresponding to A values and B values of the additional colors to an origin of the AB plane. The user interface module 202 can display the additional colors at positions of the color saturation chart determined from the order.

In one example, the color gamut module 206 can determine an indicated color in the range of the colors of the color gamut. The user interface module 202 can display, on the digital image, a color indicator that indicates the point on the digital image and displays the indicated color. For instance, the user interface module 202 can display a droplet that points to the point on the digital image and is populated with the indicated color.

In an example, the user interface module 202 receives, via the image editing interface, a user selection of a portion of the digital image to be color adjusted that includes the specified point, such as an object in the digital image that includes the specified point, and an additional user selection of a selected color from the color gamut. For instance, a user may select the object of the digital image to be color adjusted with an object segmentation tool, and click on the specified point with a mouse. The color adjustment module 212 can adjust a color of at least the object of the digital image that includes the point based on the selected color.

Figure 8:
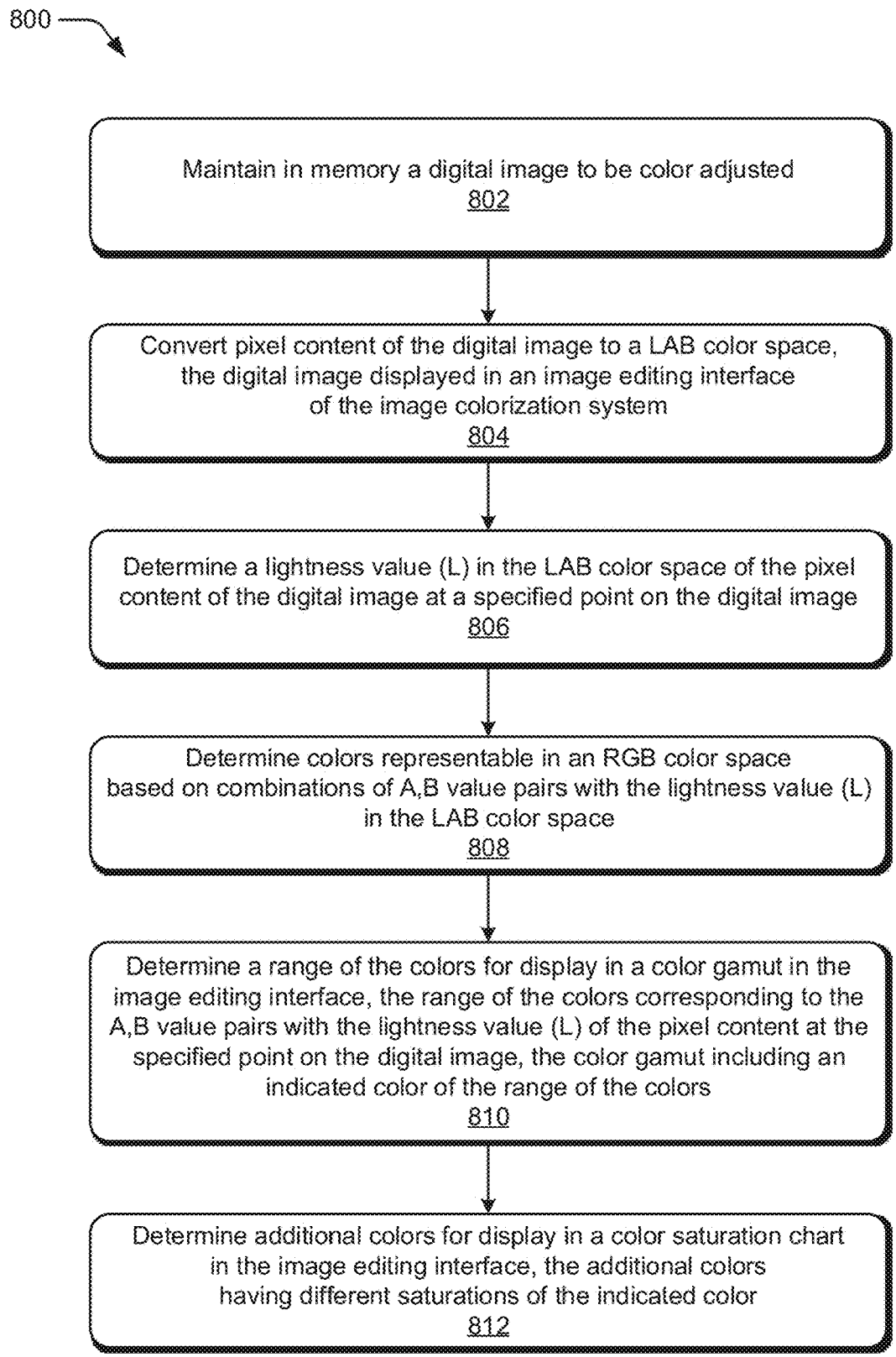
FIG. 8 illustrates a flow diagram depicting an example procedure in accordance with one or more aspects of the disclosure.

FIG. 8 illustrates an example procedure 800 for adding color to digital images in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 130 of FIG. 1 that makes use of an image colorization system, such as system 200 or image colorization system 104. An image colorization system implementing procedure 800 may be an independent application that has been installed on the computing device, a service hosted by a service provider that is accessible by the computing device, a plug-in module to the computing device, or combinations thereof.

A digital image to be color adjusted is maintained in a memory of a computing device (block 802). For example, the image colorization system 104 can maintain a digital image to be color adjusted in memory, such as in the image data 146 or storage 140 of FIG. 1. Pixel content of the digital image to be color adjusted is converted to a LAB color space (block 804). For example, the LAB module 204 can convert pixel content of the digital image to be color adjusted to a LAB color space. The digital image to be color adjusted can be displayed in an image editing interface of the user interface module 202. In one example, the LAB module 204 converts pixel content of the digital image to be color adjusted from an RGB color space to a LAB color space with a transformation that converts RGB values of pixels of the digital image to LAB values in the LAB color space.

A lightness value (L) in the LAB color space of the pixel content of the digital image at a specified point on the digital image is determined (block 806). For example, the LAB module 204 can determine a lightness value (L) in the LAB color space of the pixel content of the digital image at a specified point on the digital image, such as from a LAB value in the LAB color space for the specified point resulting from the conversion of the pixel content of the digital image to the LAB color space. The specified point can correspond to a user-specified point, such as from a user input indicating the specified point on the digital image to be color adjusted received via the image editing interface. For instance, the user can click on the specified point or touch on the specified point with a finger or stylus.

Colors representable in an RGB color space are determined based on combinations of A,B value pairs with the lightness value (L) in the LAB color space (block 808). For example, the LAB module 204 can determine colors representable in an RGB color space based on combinations of A,B value pairs with the lightness value (L) in the LAB color space. The LAB module 204 can determine LAB values in the LAB color space having the lightness value (L) of the point on the digital image to be color adjusted from the A,B value pairs in the LAB color space that can be combined with the lightness value (L) to form the colors representable in an RGB color space. For instance, the LAB module 204 can iteratively determine the LAB values by transforming the LAB values to RGB values and the RGB values back to LAB values, replacing the L values of the LAB values with the lightness value (L) corresponding to the pixel content of the specified point, and repeating the transformations until the transformed LAB values converge and include valid A,B value pairs, as described above.

In one example, the LAB module 204 determines a dense color set of the LAB values that includes valid A values and B values in the LAB color space for the lightness value (L). The valid A values and B values correspond to the A,B value pairs in the LAB color space that can be combined with the lightness value (L) to form a color representable in an RGB color space. The LAB module 204 can determine the dense color set that includes a plurality of colors in the LAB color space from the combinations of the A,B value pairs with the lightness value (L), and remove at least some colors of the plurality of colors from the dense color set. The LAB module 204 can then determine the colors representable in the RGB color space from the dense color set with at least some colors removed. For instance, the LAB module 204 can cluster the colors of the dense color set into clusters, and determine a respective color representable in the RGB color space from a respective cluster of the clusters.

A range of the colors for display in a color gamut in the image editing interface is determined, the range of the colors corresponding to the A,B value pairs with the lightness value (L) of the pixel content at the specified point on the digital image, the color gamut including an indicated color of the range of the colors (block 810). For example, the color gamut module 206 can determine a range of the colors for display in a color gamut in the image editing interface, the range of the colors corresponding to the A,B value pairs with the lightness value (L) of the pixel content at the specified point on the digital image, the color gamut including an indicated color of the range of the colors. The user interface module 202 can display, in the image editing interface, the range of colors in the color gamut. The color gamut can include an indicated color of the range of the colors. The indicated color can be a default color of the range of the colors or a user-selected color of the range of the colors.

In one example, the color gamut module 206 sorts the A,B value pairs with a two-dimensional Hilbert curve to form sorted colors. For example, the color gamut module 206 can apply the A,B value pairs along the length of a first-order Hilbert curve, and propagate in two-dimensions the Hilbert curve by a number of orders, such as to a sixth-order Hilbert curve. The color gamut module 206 can determine the sorted colors from the A values and B values of colors along the length of the sixth-order Hilbert curve together the lightness value (L). The user interface module 202 can then display the sorted colors as the range of the colors in the color gamut.

Additional colors for display in a color saturation chart in the image editing interface are determined, the additional colors having different saturations of the indicated color of the color gamut (block 812). For example, the saturation module 208 can determine additional colors having the lightness value (L) of the point on the digital image to be color adjusted and different saturations of the indicated color, such as from pairs of A values and B values in a region of an AB plane formed from the intersection of an area including the valid A,B value pairs for the lightness value (L), and an interior of parallel lines that share an angle of the A value and the B value of the indicated color in the AB plane. The user interface module 202 can display, in the image editing interface, the additional colors in a color saturation chart. In one example, the user interface module 202 displays the color gamut and the color saturation chart in a suggested colors region of the image editing interface, and the digital image to be color adjusted in an image region of the image editing interface that is a separate, distinct region from the suggested colors region.

Additionally or alternatively, the user interface module 202 can display a color palette in the suggested colors region. For example, the color palette module 210 can cluster the colors representable in the RGB color space, the combinations of A,B value pairs with the lightness value (L), or the range of colors displayed by the color gamut into color clusters, and determine a respective color center for each cluster of the color clusters. The color palette module 210 can determine a respective color that is closest to the respective color center for each respective cluster, and the user interface module 202 can display, in the image editing interface, a color palette that includes the respective color for each respective cluster.

In one example, the user interface module 202 receives, via the user interface, a user selection of a selected color of the range of the colors of the color gamut, and the color gamut module 206 changes the indicated color of the color gamut from a default color of the range of the colors to the selected color. The saturation module 208 can determine an A value and a B value in the LAB color space of the indicated color, and an angle of the A value and the B value of the indicated color in an AB plane (e.g., an angle relative to the A dimension or B dimension of the AB plane). The saturation module 208 can determine a region in the AB plane based on the angle of the A value and the B value of the indicated color and a threshold value. The saturation module 208 can then determine the additional colors from the A,B value pairs that are in the region in the AB plane. The saturation module 208 can determine the region in the AB plane as an interior formed from an upper line in the AB plane and a lower line in the AB plane that are (i) parallel and separated by a distance of the threshold value, such as ten units of A or B values, (ii) at the angle of the A value and the B value of the indicated color, and (iii) equidistant along a normal to the upper line and the lower line from a location in the AB plane of the A value and the B value of the indicated color.

In an example, the user interface module 202 receives, via the image editing interface, a user selection of a selected color of the range of the colors of the color gamut or the additional colors of the color saturation chart. The color adjustment module 212 can adjust one or more colors of at least a portion of the digital image to be color adjusted based on the selected color, the portion including the specified point on the digital image to be color adjusted.

FIG. 9 illustrates an example procedure 900 for adding color to digital images in accordance with one or more aspects of the disclosure. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 130 of FIG. 1 that makes use of an image colorization system, such as system 200 or image colorization system 104. An image colorization system implementing procedure 900 may be an independent application that has been installed on the computing device, a service hosted by a service provider that is accessible by the computing device, a plug-in module to the computing device, or combinations thereof.

Colors representable in an RGB color space are determined based on combinations of A,B value pairs with a lightness value (L) in a LAB color space, the lightness value (L) corresponding to pixel content at a specified point of a digital image to be color adjusted (block 902). For example, the user interface module 202 can display the digital image to be color adjusted in an image editing interface of a computing device, and receive a user selection of the specified point of the digital image, such as with a mouse click. The LAB module 204 can convert pixel content of the digital image to be color adjusted to a LAB color space, such as with a transformation that converts RGB values of pixels of the digital image to LAB values in the LAB color space. The LAB module 204 can determine a lightness value (L) in the LAB color space of the specified point on the digital image, e.g., from a LAB value in the LAB color space for the specified point resulting from converting the pixel content of the digital image to the LAB color space. The LAB module 204 can then determine colors representable in an RGB color space based on combinations of A,B value pairs with the lightness value (L) in the LAB color space, such as by iteratively transforming LAB values to RGB values and the RGB values back to LAB values, replacing the L values of the LAB values with the lightness value (L) corresponding to the pixel content of the specified point, and repeating the transformations until the transformed LAB values converge and include valid A,B value pairs. The LAB module 204 can determine the colors representable in the RGB color space from the LAB values that include the valid A,B value pairs and the lightness value (L).

The colors are clustered into color clusters (block 904). The LAB module 204 can cluster the colors in color clusters. In one example, the LAB module 204 forms a user-specified number of color clusters. For instance, a user may select a number in an image editing interface for the number of colors to be displayed in a color palette, such as seven colors, and the LAB module 204 can form the user-specified number of color clusters. The LAB module 204 can cluster the colors into color clusters in any suitable way, such as by grouping similar colors (e.g., colors having A values and B values within a distance threshold can be assigned to a same cluster).

A color palette for display in an image editing interface of the computing device is determined, the color palette including a respective color that is closest to a respective color center for each respective color cluster (block 906). For example, the color palette module 210 can determine a color palette for display in an image editing interface of the computing device, the color palette including a respective color that is closest to a respective color center for each respective color cluster. For instance, the color palette module 210 can determine a respective color for each color cluster as the color of the color cluster having an A,B value pair that is closest to the A,B value pair of the color center of the color cluster.

In one example, the color gamut module 206 sorts the A,B value pairs belonging to the combinations of A,B value pairs and the lightness value (L) with a two-dimensional Hilbert curve to form sorted colors. The color gamut module 206 can then determine a range of the sorted colors for display in a color gamut in the image editing interface, and the user interface module 202 can display, in the image editing interface, the color gamut including the range of the sorted colors.

In an example, a user selection of a selected color of the color gamut is received via the image editing interface, and the saturation module 208 determines additional colors for display in a color saturation chart in the image editing interface, the additional colors having different saturations of the selected color. For instance, the saturation module 208 can determine an A value and a B value in the LAB color space of the selected color, and a region in an AB plane that corresponds to the lightness value (L) and encloses a location of the A value and the B value of the selected color. The saturation module 208 can then determine the additional colors from the region in the AB plane.

The procedures described herein constitute an improvement over conventional image colorization procedures that suggest colors for a digital image being edited that are not based on the digital image, but instead are generic or default colors suggested without regard to the digital image being edited. Rather, the procedures described herein suggest colors for adding color to a digital image based on the digital image itself. Hence, the procedures described herein suggest colors that represent a good starting point for adding color to the digital image, and are thus efficient to use and can produce colorization results superior to conventional image colorization procedures.

Moreover, the procedures described herein can determine colors having a same lightness value (L) in a LAB color space as a user-specified point on the digital image, and determine more colors than is humanly possible to visualize at any one time. By generating various representations of the colors to suggest to a user, including a color gamut that displays a range of colors having the lightness value (L) of the user-specified point, a color saturation chart that displays additional colors having different saturations of an indicated color of the color gamut, and a color palette that displays a reduced version of the suggested colors for the digital image, the procedures described herein suggest colors for a digital image to a user with color representations that make it easy for the user to navigate and do not overwhelm the user with color suggestions, despite that the procedures have generated more colors than is humanly possible to contemplate at any one time. Hence, the procedures described herein can achieve colorization results that are simply not possible using conventional image colorization procedures. Moreover, because the procedures described herein determine colors to suggest based on a lightness value (L) of a point on the digital image, the procedures can suggest colors for black-and-white images and color images.

Example Systems and Devices

Figure 10:
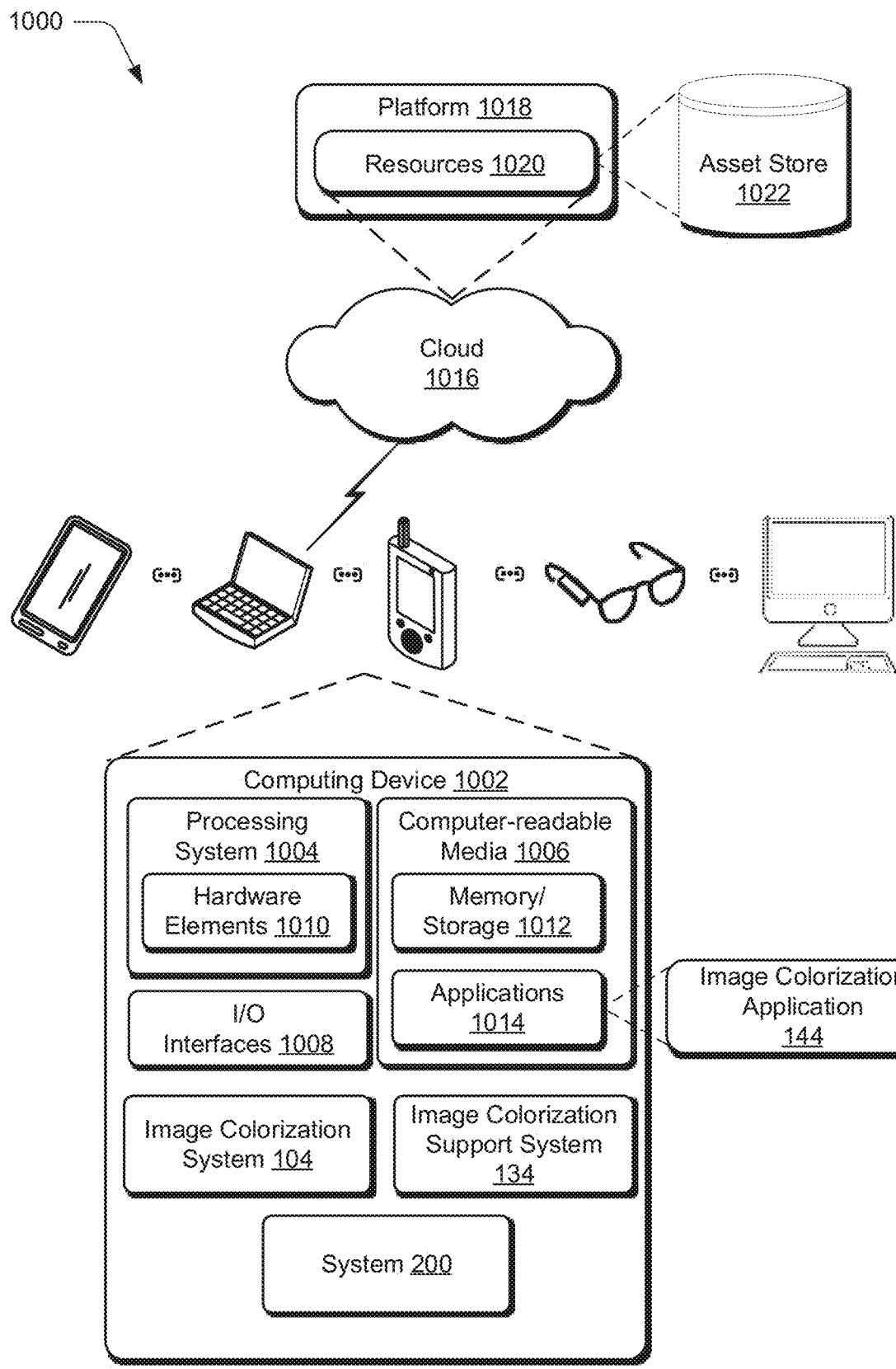
FIG. 10 illustrates an example system including various components of an example device that can be implemented as any type of computing device as described and/or utilized with reference to FIGS. 1-9 to implement aspects of the techniques described herein.

FIG. 10 illustrates an example system 1000 including an example computing device 1002 that is representative of one or more computing systems and devices that can be utilized to implement the various techniques described herein. This is illustrated through inclusion of image colorization system 104, system 200, image colorization application 144, and image colorization support system 134, which operate as described above. Computing device 1002 can be, for example, a user computing device (e.g., computing device 102), or a server device of a service provider, (e.g., server 130). Furthermore, computing device 1002 can include an on-chip system, multiple computing devices, combinations thereof, or any other suitable computing device or computing system. Accordingly, FIG. 10 illustrates computing device 1002 as one or more of a tablet, a laptop computer, a smart phone, smart eye glasses, and a desktop computer, though these examples are illustrative and in no way are meant to limit the type or number of devices that can be represented by computing device 1002.

The example computing device 1002 includes a processing system 1004, one or more computer-readable media 1006, and one or more I/O interfaces 1008 that are communicatively coupled to each other. Although not shown, computing device 1002 can further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1004 is representative of functionality to perform one or more operations using hardware. Accordingly, processing system 1004 is illustrated as including hardware elements 1010 that can be configured as processors, functional blocks, and so forth. This may include implementation in hardware as an application specific integrated circuit or other logic device formed using one or more semiconductors. Hardware elements 1010 are not limited by the materials from which they are formed or the processing mechanisms employed therein. For example, processors can be comprised of semiconductor(s) and transistors (e.g., electronic integrated circuits (ICs)). In such a context, processor-executable instructions may be electronically-executable instructions. Processors 138 in FIG. 1 are an example of processing system 1004.

Computer-readable storage media 1006 is illustrated as including memory/storage 1012. Storage 140 in FIG. 1 is an example of memory/storage of memory/storage 1012. Memory/storage 1012 can include volatile media (such as random access memory (RAM)), nonvolatile media (such as read only memory (ROM), flash memory, optical disks, magnetic disks, and so forth), or combinations thereof. Memory/storage 1012 can include fixed media (e.g., RAM, ROM, a fixed hard drive, and so on) as well as removable media (e.g., flash memory, a removable hard drive, an optical disc, and so forth). Computer-readable media 1006 can be configured in a variety of other ways as further described below.

Input/output interfaces 1008 are representative of functionality to allow a user to enter commands and information to computing device 1002, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Accordingly, input/output interfaces 1008 can include a touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Thus, computing device 1002 can be configured in a variety of ways as further described below to support user interaction.

Computing device 1002 also includes applications 1014. Applications 1014 are representative of any suitable applications capable of running on computing device 1002, and can include a web browser which is operable to access various kinds of web-based resources (e.g., images, videos, assets, media clips, images, content, configuration files, services, user profiles, and the like). Applications 1014 include image colorization application 144, which operates as previously described. Furthermore, applications 1014 may include any applications supporting image colorization system 104, system 200, and image colorization support system 134.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1002. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1010, or combinations thereof. Computing device 1002 may be configured to implement particular instructions and functions corresponding to the software and hardware modules. Accordingly, implementation of a module that is executable by computing device 1002 as software may be achieved at least partially in hardware, e.g., through use of computer-readable storage media and hardware elements 1010 of processing system 1004. The instructions and functions may be executable/operable by one or more articles of manufacture (for example, one or more computing devices such as computing device 1002 or processing systems such as processing system 1004) to implement techniques, modules, and examples described herein.

The techniques described herein may be supported by various configurations of computing device 1002 and are not limited to the specific examples of the techniques described herein. This functionality may also be implemented all or in part through use of a distributed system, such as over a "cloud" 1016 via a platform 1018. Cloud 1016 includes and is representative of a platform 1018 for resources 1020. Platform 1018 abstracts underlying functionality of hardware (e.g., servers) and software resources of cloud 1016. Resources 1020 may include applications, data, or applications and data that can be utilized while computer processing is executed on servers that are remote from computing device 1002. Resources 1020 can also include services provided over the Internet, through a subscriber network, such as a cellular or Wi-Fi network, or combinations thereof. Resources 1020 can include asset store 1022, which stores assets, such as videos, photographs (e.g., user images in a gallery, a database of stock photographs, and the like), design files, documents, user profile data, user image libraries, photographs posted in a shared photo service, animation sequences, digital images, metadata of assets, and the like, and may be accessed by computing device 1002.

Generally, resources 1020 may be licensed, purchased, or may be made freely available, (e.g., without authentication, license, or account-based access). The resources 1020 can include any suitable combination of services and content, such as a video-editing service, an on-line shopping service, an image editing service, an artwork drawing service, a web development and management service, a collaboration service, a social networking service, a messaging service, an advertisement service, a graphics design service, an animation service, an image storage service (including storage of photos, digital images, documents, records, files, and the like), a graphics editing service, an asset distribution service, and so forth. Content may include various combinations of assets as described above, including document designs and review documents.

Platform 1018 may abstract resources and functions to connect computing device 1002 with other computing devices. Platform 1018 may also serve to abstract scaling of resources to provide a corresponding level of scale to encountered demand for resources 1020 that are implemented via platform 1018. Accordingly, in an interconnected device embodiment, implementation of functionality described herein may be distributed throughout system 1000. For example, the functionality may be implemented in part on computing device 1002 as well as via platform 1018 that abstracts the functionality of cloud 1016.

CONCLUSION

In one or more implementations, a digital medium environment includes at least one computing device. Systems, devices, and techniques are described herein for adding color to digital images. An image colorization system is implemented to display suggested colors for adding color to a digital image. The image colorization system can determine the suggested colors to display based on the digital image that is being edited, rather than simply a default or generic set of colors that is not based on the digital image. The image colorization system can convert pixel content of the digital image to be color adjusted to a LAB color space, and determine the suggested colors from LAB values in the LAB color space for the digital image. For example, the image colorization system can receive one or more user inputs that indicate a point on a digital image, and determine a lightness value (L) in the LAB color space of the point. The image colorization system can determine colors representable in an RGB color space based on combinations of A,B value pairs with the lightness value (L) in the LAB color space, and determine a range of the colors for display in a color gamut in the image editing interface. The range of the colors correspond to the A,B value pairs with the lightness value (L) of the pixel content at the specified point on the digital image. The image colorization system can also determine additional colors having different saturations of an indicated color in the color gamut, such as a user-selected color in the color gamut, and display the additional colors having the different saturations of the indicated color in a color saturation chart in the user interface. The image colorization system can also cluster colors of the color gamut, determine a respective color for each of the clusters, and display the respective color for each of the clusters in a color palette. A user can select a color from the color gamut, the color saturation chart, or the color palette, and the image colorization system can adjust the digital image based on the selected color.

Hence, the image colorization system provides suggested colors that are determined from the digital image itself, and therefore represent a good starting point to add color to the digital image, unlike conventional colorization systems that do not suggest colors based on the digital image, but instead display generic or default colors unrelated to the digital image. Accordingly, the image colorization system is efficient, and can produce colorization results superior to conventional colorization systems. Moreover, because the image colorization system determines colors to suggest based on a lightness value (L) of a point on the digital image, the image colorization system can suggest colors for black-and-white images and color images.

Although implementations of adding color to digital images have been described in language specific to features and/or methods, the appended claims are not necessarily limited to the specific features or methods described. Rather, the specific features and methods are disclosed as example implementations of adding color to digital images, and other equivalent features and methods are intended to be within the scope of the appended claims. Further, various different examples are described and it is to be appreciated that each described example can be implemented independently or in connection with one or more other described examples.

What is claimed is:

1. In a digital medium environment for adding color to digital images, a method implemented by a computing device, the method comprising:
   converting pixel content of a digital image to a LAB color space, the digital image displayed in an image editing interface to be color adjusted;
   determining a lightness value (L) in the LAB color space of the pixel content of the digital image at a specified point on the digital image;
   determining colors representable in an RGB color space based on combinations of A,B value pairs with the lightness value (L) in the LAB color space; and
   determining a range of the colors for display in a color gamut in the image editing interface, the range of the colors corresponding to the A,B value pairs with the lightness value (L) of the pixel content at the specified point on the digital image.

2. The method as described in claim 1, further comprising:
   receiving, via the user interface, a user selection of an object in the digital image, the object including the specified point;
   receiving, via the user interface, an additional user selection of a selected color from the color gamut; and
   adjusting a color of at least the object in the digital image that includes the specified point based on the selected color.

3. The method as described in claim 1, further comprising:
   forming clusters of the combinations of the A,B value pairs with the lightness value (L); and
   determining, for each cluster of the clusters, a respective color of the range of the colors.

4. The method as described in claim 1, further comprising:
   sorting the A,B value pairs with a two-dimensional Hilbert curve to form sorted colors; and
   displaying the sorted colors as the range of the colors in the color gamut in the image editing interface.

5. The method as described in claim 4, further comprising:
   clustering the sorted colors into clusters of the sorted colors;
   determining a respective color center for each cluster of the clusters of the sorted clusters;
   determining a respective sorted color that is closest to the respective color center for each respective cluster of the sorted clusters; and
   determining a color palette for display in the image editing interface, the color palette including the respective sorted color for each respective cluster of the sorted clusters.

6. The method as described in claim 1, further comprising:
   determining an indicated color of the range of the colors in the color gamut;
   determining additional colors having different saturations of the indicated color; and
   determining a color saturation chart for display in the image editing interface, the color saturation chart including the additional colors having the different saturations.

7. The method as described in claim 6, further comprising:
   determining an A value and a B value in the LAB color space of the indicated color;
   determining an angle of the A value and the B value of the indicated color in an AB plane;
   determining a region in the AB plane based on the angle of the A value and the B value of the indicated color and a threshold value; and
   wherein the determining the additional colors having the different saturations of the indicated color includes determining the additional colors from the A,B value pairs that are in the region in the AB plane.

8. The method as described in claim 7, further comprising:
   determining an order of the additional colors based on distances of points corresponding to A values and B values of the additional colors to an origin of the AB plane; and
   displaying, in the image editing interface, the additional colors at positions of the color saturation chart determined from the order.

9. The method as described in claim 1, further comprising:
   determining an indicated color of the range of the colors in the color gamut; and
   displaying on the digital image a color indicator that indicates the specified point on the digital image and displays the indicated color.

10. The method as described in claim 1, wherein the digital image is one of a black and white image or a colorized image formed by adding color to the black and white image.

11. A computing device to implement an image colorization system for adding color to digital images in a digital medium environment, the computing device comprising:
    a memory to maintain a digital image to be color adjusted; and
    a processor system to implement an image colorization application at least partially in hardware of the computing device to:
      convert pixel content of the digital image to a LAB color space, the digital image displayed in an image editing interface of the image colorization system;
      determine a lightness value (L) in the LAB color space of the pixel content of the digital image at a specified point on the digital image;
      determine colors representable in an RGB color space based on combinations of A,B value pairs with the lightness value (L) in the LAB color space;
      determine a range of the colors for display in a color gamut in the image editing interface, the range of the colors corresponding to the A,B value pairs with the lightness value (L) of the pixel content at the specified point on the digital image, the color gamut including an indicated color of the range of the colors; and
      determine additional colors for display in a color saturation chart in the image editing interface, the additional colors having different saturations of the indicated color.

12. The computing device as described in claim 11, wherein the image colorization application is implemented to:
    receive, via the image editing interface, a user selection of a selected color of the range of the colors of the color gamut or the additional colors of the color saturation chart; and
    adjust one or more colors of at least a portion of the digital image to be color adjusted based on the selected color, the portion including the specified point.

13. The computing device as described in claim 11, wherein the image colorization application is implemented to:

receive, via the image editing interface, a user selection of a selected color of the range of the colors of the color gamut;

change the indicated color from a default color of the range of the colors of the color gamut to the selected color;

determine an A value and a B value in the LAB color space of the indicated color;

determine an angle of the A value and the B value of the indicated color in an AB plane;

determine a region in the AB plane based on the angle of the A value and the B value of the indicated color and a threshold value; and determine the additional colors from the A,B value pairs that are in the region in the AB plane.

14. The computing device as described in claim 13, wherein the image colorization application is implemented to determine the region in the AB plane as an interior formed from an upper line in the AB plane and a lower line in the AB plane that are:

parallel and separated by a distance of the threshold value;

at the angle of the A value and the B value of the indicated color; and equidistant along a normal to the upper line and the lower line from a location in the AB plane of the A value and the B value of the indicated color.

15. The computing device as described in claim 11, wherein the image colorization application is implemented to:

sort the A,B value pairs with a two-dimensional Hilbert curve to form sorted colors; and display the sorted colors as the range of the colors in the color gamut in the image editing interface.

16. The computing device as described in claim 11, wherein the image colorization application is implemented to:

determine a dense color set that includes a plurality of colors in the LAB color space from the combinations of the A,B value pairs with the lightness value (L);

remove at least some colors of the plurality of colors from the dense color set; and determine the colors representable in the RGB color space from the dense color set with the at least some colors removed.

17. The computing device as described in claim 11, wherein the image colorization application is implemented to:

cluster the combinations of the A,B value pairs with the lightness value (L) into color clusters;

determine a respective color center for each cluster of the color clusters;

determine a respective color that is closest to the respective color center for each respective cluster; and determine a color palette for display in the image editing interface, the color palette including the respective color for each respective cluster.

18. In a digital medium environment for adding color to digital images, a method implemented by a computing device, the method comprising:

a step for determining colors representable in an RGB color space based on combinations of A,B value pairs with a lightness value (L) in a LAB color space, the lightness value (L) corresponding to pixel content at a specified point of a digital image to be color adjusted;

clustering the colors into color clusters; and a step for determining a color palette for display in an image editing interface, the color palette including a respective color that is closest to a respective color center for each respective color cluster.

19. The method as described in claim 18, further comprising:

sorting the A,B value pairs with a two-dimensional Hilbert curve to form sorted colors; and determining a range of the sorted colors for display in a color gamut in the image editing interface.

20. The method as described in claim 19, further comprising:

receiving, via the image editing interface, a user selection of a selected color of the color gamut; and determining additional colors for display in a color saturation chart in the image editing interface, the additional colors having different saturations of the selected color.

* * * * *